(12) United States Patent
Kitano et al.

(10) Patent No.: US 11,797,012 B2
(45) Date of Patent: Oct. 24, 2023

(54) MOBILE ROBOT, MOBILE ROBOT CONTROL SYSTEM, AND MOBILE ROBOT CONTROL METHOD

(71) Applicant: THK CO., LTD., Tokyo (JP)

(72) Inventors: Hitoshi Kitano, Tokyo (JP); Takashi Naito, Tokyo (JP)

(73) Assignee: THK CO., LTD., Tokyo (JP)

( * ) Notice: Subject to any disclaimer, the term of this patent is extended or adjusted under 35 U.S.C. 154(b) by 153 days.

(21) Appl. No.: 17/440,247

(22) PCT Filed: Feb. 12, 2020

(86) PCT No.: PCT/JP2020/005327
§ 371 (c)(1),
(2) Date: Sep. 17, 2021

(87) PCT Pub. No.: WO2020/189102
PCT Pub. Date: Sep. 24, 2020

(65) Prior Publication Data
US 2022/0171393 A1 Jun. 2, 2022

(30) Foreign Application Priority Data
Mar. 20, 2019 (JP) ................................. 2019-052688

(51) Int. Cl.
*G05D 1/02* (2020.01)
(52) U.S. Cl.
CPC .................... *G05D 1/0212* (2013.01)
(58) Field of Classification Search
CPC ................................................... G05D 1/0212
USPC ........................................................ 701/25
See application file for complete search history.

(56) References Cited

U.S. PATENT DOCUMENTS 8,412,400 B2 * 4/2013 D'Andrea ............ G05D 1/0291
701/28
10,444,755 B2 * 10/2019 Kuroda ................ G05D 1/0212
(Continued)

FOREIGN PATENT DOCUMENTS

CN 107390721 A 11/2017
CN 109426266 A 3/2019
(Continued)

OTHER PUBLICATIONS

Office Action dated May 31, 2022, issued in counterpart JP Application No. 2019-052688, with English Translation. (6 pages).
(Continued)

*Primary Examiner* — Yazan A Soofi
(74) *Attorney, Agent, or Firm* — WHDA, LLP

(57) ABSTRACT

A mobile robot includes: a drive unit that changes a moving speed and a travel direction; a detection unit that detects a plurality of detection target objects 11; and a control unit 27 that acquires a distance Z and a direction θ to the detection target object unit, calculates a travel direction in which the distance and the direction to the detection target object satisfy a predetermined relationship, and drives and controls the drive unit on the basis of the calculated travel direction. The control unit calculates a distance x in a direction orthogonal to the movement route between the detection target object and a current position of the mobile robot and the direction to the detection target object, calculates a difference δx between the distance x and a certain distance Xref, and executes drive control for the drive unit to cause the difference δx to be 0 (zero).

6 Claims, 20 Drawing Sheets

(56) References Cited

U.S. PATENT DOCUMENTS

| | | | |
|---|---|---|---|
| 10,955,855 B1* | 3/2021 | Tran | G05D 1/0246 |
| 11,225,249 B2* | 1/2022 | Ueda | B60W 10/20 |
| 11,500,386 B2* | 11/2022 | Kobayashi | G05D 1/0088 |
| 11,628,832 B2* | 4/2023 | Suzuki | G08G 1/14 |
| | | | 701/117 |
| 2012/0265346 A1 | 10/2012 | Gilbert, Jr. et al. | |
| 2017/0150676 A1 | 6/2017 | Yamauchi et al. | |
| 2018/0253104 A1* | 9/2018 | Miyamoto | G05D 1/0274 |
| 2018/0335781 A1* | 11/2018 | Chase | G08G 1/0112 |
| 2021/0089045 A1* | 3/2021 | Kitano | G05D 1/0223 |
| 2022/0234577 A1* | 7/2022 | Baba | B60W 60/0015 |
| 2023/0110713 A1* | 4/2023 | Degirmenci | G06N 3/006 |
| | | | 701/24 |

FOREIGN PATENT DOCUMENTS

| | | |
|---|---|---|
| JP | 7-203706 A | 8/1995 |
| JP | 2005-18248 A | 1/2005 |
| JP | 2017-123804 A | 7/2017 |
| JP | 2018-147081 A | 9/2018 |
| WO | 2018/016584 A1 | 1/2018 |

OTHER PUBLICATIONS

International Search Report dated Apr. 7, 2020, issued in counterpart International Application No. PCT/JP2020/005327 (2 pages).
Office Action dated Jun. 5, 2023, issued in counterpart Taiwanese Application No. 10220545040 (11 pages).

* cited by examiner

Fig. 4

| BEACON ID | PATHWAY DISTANCE | INSTALLATION SIDE | DIRECTION CHANGE | LAST BEACON |
|---|---|---|---|---|
| 1 | $D_1$ | LEFT | 0 DEGREES | NO |
| 2 | $D_2$ | LEFT | 0 DEGREES | NO |
| ... | ... | ... | ... | ... |
| m | $D_m$ | LEFT | 90 DEGREES | NO |
| ... | ... | ... | ... | ... |
| M | $D_M$ | LEFT | 0 DEGREES | YES |

Fig. 11

| BEACON ID | PATHWAY DISTANCE | INSTALLATION SIDE | DIRECTION CHANGE | LAST BEACON |
|---|---|---|---|---|
| 1 | $D_1$ | LEFT | 0 DEGREES | NO |
| 2 | $D_2$ | LEFT | 0 DEGREES | NO |
| ⋮ | ⋮ | ⋮ | ⋮ | ⋮ |
| m | $D_m$ | LEFT | 90 DEGREES | NO |
| ⋮ | ⋮ | ⋮ | ⋮ | ⋮ |
| M | $D_M$ | LEFT | 0 DEGREES | YES |

Fig. 19
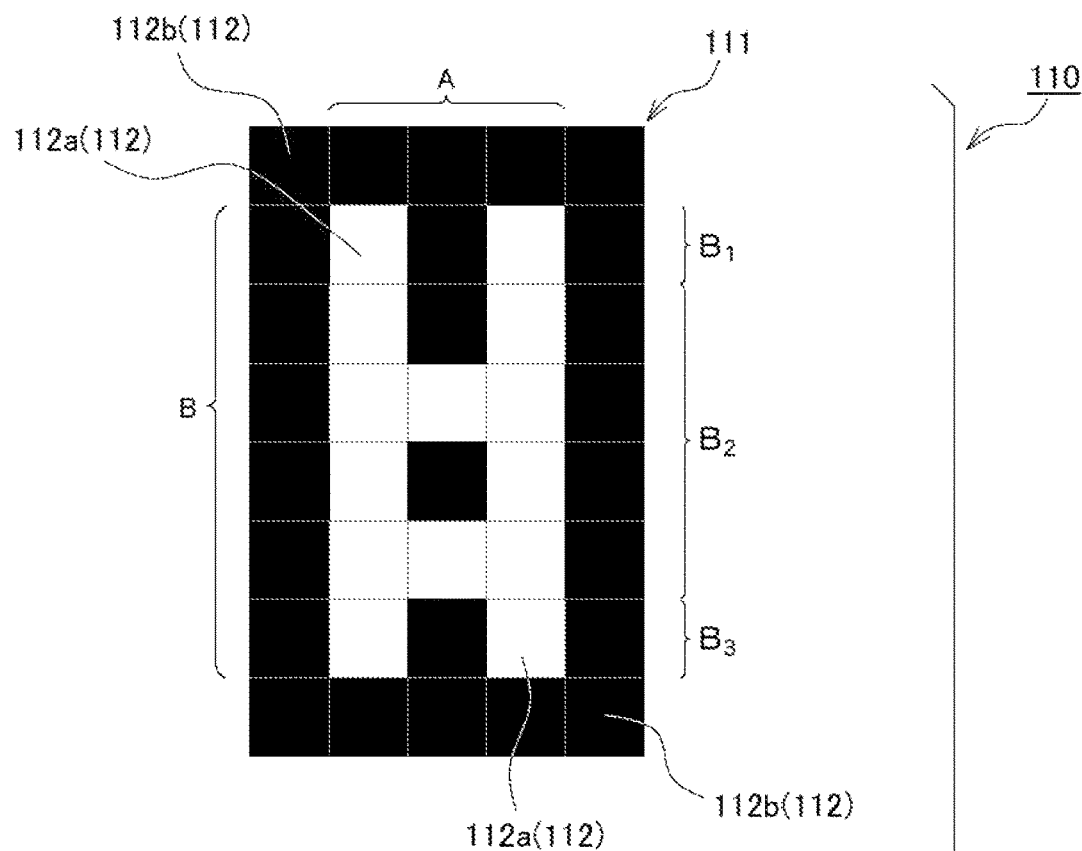
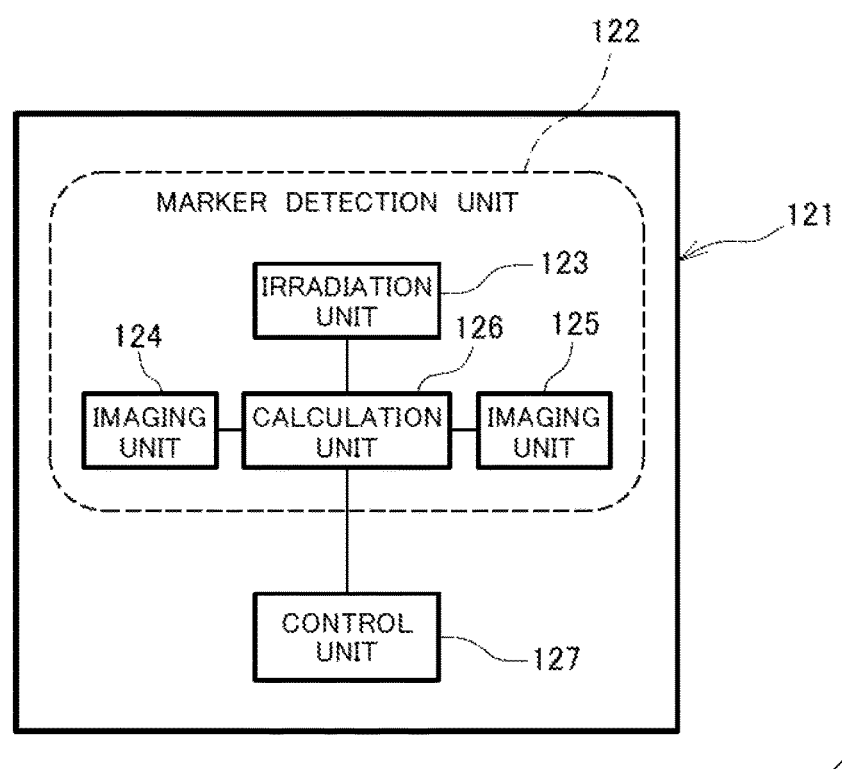

MOBILE ROBOT, MOBILE ROBOT CONTROL SYSTEM, AND MOBILE ROBOT CONTROL METHOD

TECHNICAL FIELD

The present invention relates to a mobile robot, a mobile robot control system, and a mobile robot control method.

BACKGROUND ART

Conventionally, a transmitter such as a beacon has been used to guide a mobile robot that moves autonomously. For example, a cleaning robot as a mobile robot moves toward a charger and receives electric power from the charger on the basis of a signal emitted from a beacon provided in the charger.

The range of utilization of such mobile robots has been expanding in recent years. For example, automated guided vehicles used in plants and logistics warehouses, and service robots in public facilities such as facilities, halls, and airports are utilization examples of mobile robots. For example, there is, in the description of the technology in Patent Literature 1 below, a disclosure of a system in which an automated guided vehicle detects a relative position with respect to a plurality of positioning devices installed in a traveling environment and travels autonomously.

CITATION LIST

Patent Literature

Patent Literature 1: Japanese Patent Laid-Open No. 2005-018248

SUMMARY OF INVENTION

Problems to be Solved by the Invention

However, this technology determines the traveling lane by calculating the relative positions with respect to the positioning devices. If the position of the automated guided vehicle shifts due to some influence, there is a possibility that the automated guided vehicle travels on a lane different from a desired traveling lane. Even in such a case, in order for the automated guided vehicle to travel on the desired traveling lane, it is necessary to store all the relative positions of the desired traveling lane with respect to the positioning devices, which may increase the memory capacity and increase the man-hours required for setting the desired traveling lane.

The present invention has been made in view of various problems present in the above-mentioned conventional technology, and an object of the present invention is to provide a mobile robot control system, a mobile robot control method, and a mobile robot used therefor, which does not require a large-capacity memory for storing a traveling lane and man-hours for setting the traveling lane when the mobile robot is caused to travel autonomously.

Means for Solving the Problems

A mobile robot according to the present invention is a mobile robot including: a drive unit that changes a moving speed and a travel direction; a detection unit that detects a plurality of detection target objects arranged along a movement route to a target point; and a control unit that acquires a distance and a direction to the detection target object detected by the detection unit, calculates a travel direction in which the distance and the direction to the detection target object satisfy a predetermined relationship, and drives and controls the drive unit on the basis of the calculated travel direction, wherein the mobile robot is used under a setting environment in which a boundary is set in the movement route at least on either a left or right side with respect to the travel direction of the mobile robot, the plurality of detection target objects are arranged along the boundary forming the movement route, and a target route is set at a position away from the boundary by a certain distance to cause the mobile robot to move while maintaining the certain distance from the boundary, and the control unit is configured to calculate a distance in a direction orthogonal to the movement route between the detection target object arranged along the boundary and a current position of the mobile robot on the basis of the distance and the direction to the detection target object detected by the detection unit at least when the mobile robot tries to start moving along the target route toward the target point, calculate a difference between the distance and the certain distance, and execute drive control for the drive unit to cause the difference to be 0 (zero).

A mobile robot control system according to the present invention is a mobile robot control system including: a drive unit that changes a moving speed and a travel direction of a mobile robot; a detection unit that detects a plurality of detection target objects arranged along a movement route to a target point; and a control unit that acquires a distance and a direction to the detection target object detected by the detection unit, calculates a travel direction in which the distance and the direction to the detection target object satisfy a predetermined relationship, and drives and controls the drive unit on the basis of the calculated travel direction, a boundary being set in the movement route at least on either a left or right side with respect to the travel direction of the mobile robot, the plurality of detection target objects being arranged along the boundary forming the movement route, and a target route being set at a position away from the boundary by a certain distance to cause the mobile robot to move while maintaining the certain distance from the boundary, wherein the control unit is configured to calculate a distance in a direction orthogonal to the movement route between the detection target object arranged along the boundary and a current position of the mobile robot on the basis of the distance and the direction to the detection target object detected by the detection unit at least when the mobile robot tries to start moving along the target route toward the target point, calculate a difference between the distance and the certain distance, and execute drive control for the drive unit to cause the difference to be 0 (zero).

A mobile robot control method according to the present invention is a mobile robot control method in a mobile robot including: a drive unit that changes a moving speed and a travel direction of the mobile robot; a detection unit that detects a plurality of detection target objects arranged along a movement route to a target point; and a control unit that acquires a distance and a direction to the detection target object detected by the detection unit, calculates a travel direction in which the distance and the direction to the detection target object satisfy a predetermined relationship, and drives and controls the drive unit on the basis of the calculated travel direction, a boundary being set in the movement route at least on either a left or right side with respect to the travel direction of the mobile robot, the plurality of detection target objects being arranged along the boundary forming the movement route, and a target route being set at a position away from the boundary by a certain distance to cause the mobile robot to move while maintaining the certain distance from the boundary, the method including processes of: acquiring the distance and direction to the detection target object detected by the detection unit; calculating the travel direction in which the distance and the direction to the detection target object satisfy a predetermined relationship; and driving and controlling the drive unit on the basis of the calculated travel direction, wherein the control unit executes a process of calculating a distance in a direction orthogonal to the movement route between the detection target object arranged along the boundary and a current position of the mobile robot on the basis of the distance and the direction to the detection target object detected by the detection unit at least when the mobile robot tries to start moving along the target route toward the target point, a process of calculating a difference between the distance and the certain distance, and a process of executing drive control for the drive unit to cause the difference to be 0 (zero).

Effects of the Invention

According to the present invention, it is possible to provide a mobile robot control system, a mobile robot control method, and a mobile robot used therefor, which does not require a large-capacity memory for storing a traveling lane and man-hours for setting the traveling lane when the mobile robot is caused to travel autonomously and which can quickly guide the mobile robot to a desired route in a pathway.

BRIEF DESCRIPTION OF THE DRAWINGS

FIG. 4 is a diagram illustrating an example of a table stored in a movement route storage unit according to the first embodiment.

FIG. 11 is a diagram illustrating an example of a table stored in a movement route storage unit according to the second embodiment.

FIG. 19 is a block diagram illustrating a system configuration example of an image processing device applicable to the mobile robot according to the present invention.

MODE FOR CARRYING OUT THE INVENTION

Hereinafter, preferred embodiments for carrying out the present invention will be described with reference to the drawings. It is to be noted that the following embodiments do not limit the inventions according to the claims, and all the combinations of the features described in the embodiments are not necessarily essential to the solving means of the invention.

First Embodiment

First, a first embodiment, which is the basic embodiment of a mobile robot control system according to the present invention, will be described with reference to FIGS. 1 to 7. The first embodiment is an embodiment in which a mobile robot 30 operates on the basis of the distance Z to a beacon 11-1 detected by the mobile robot 30 and a beacon passing distance x calculated on the basis of this distance Z.

Figure 1:
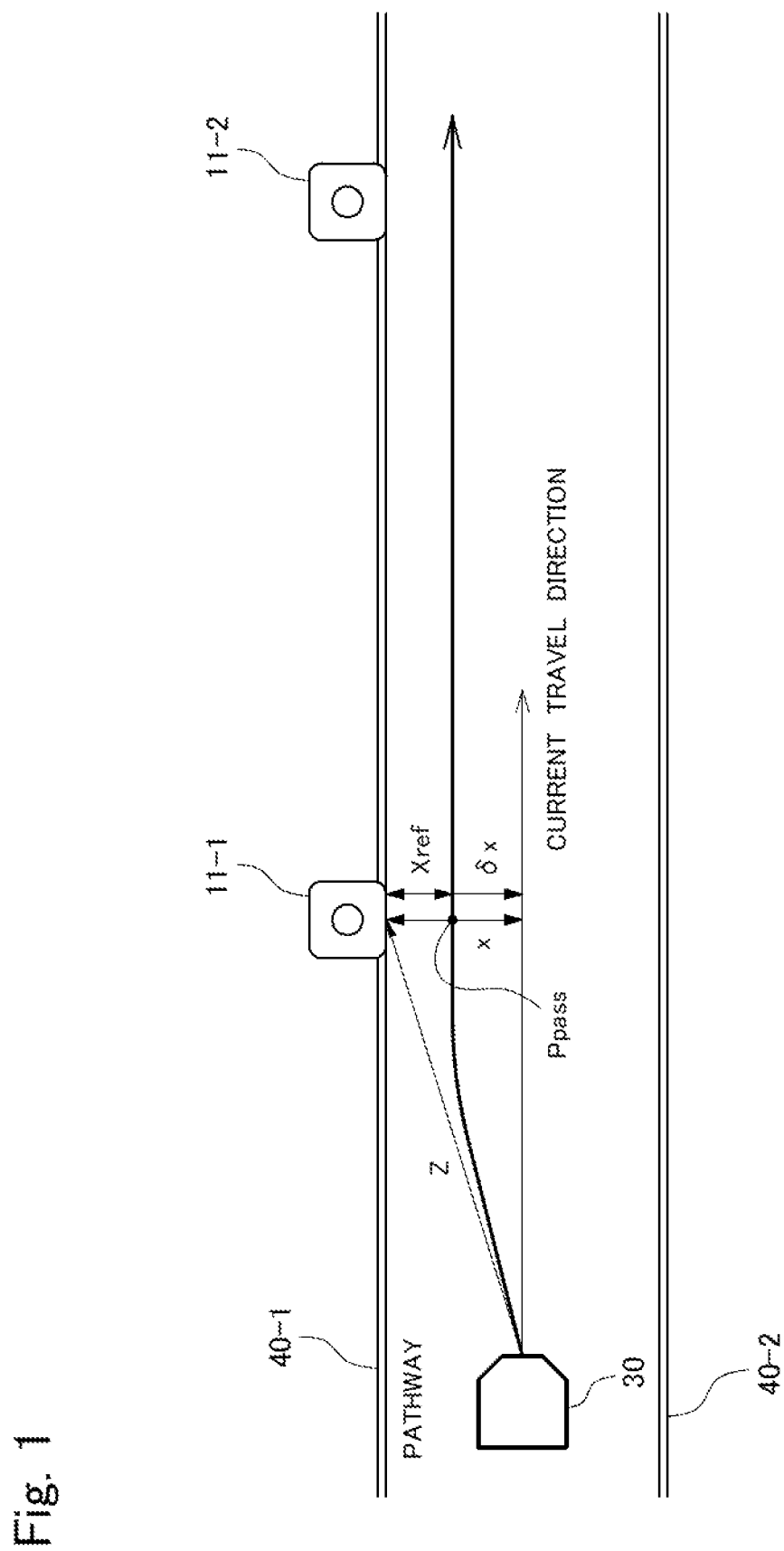
FIG. 1 is a diagram illustrating a basic movement example of a mobile robot according to a first embodiment.

FIG. 1 is a diagram illustrating a basic movement example of the mobile robot 30 according to the first embodiment. The mobile robot 30 detects a beacon 11 (11-1, 11-2) as a detection target object arranged along a boundary 40 (40-1, 40-2) that defines a pathway, and moves toward a target point while maintaining a certain distance Xref from the boundary 40 on the basis of the position of the detected beacon 11. A beacon ID that uniquely identifies each of the beacons 11 is assigned to the beacon 11 as a transmitter. The beacon 11 transmits, for example, an infrared signal including a signal indicating a beacon ID, and is represented by a periodic change in the infrared signal. The boundary 40 that defines the pathway is, for example, a wall, a partition, a white line, or the like.

In the movement example illustrated in FIG. 1, the mobile robot 30 moves while maintaining a certain distance Xref from the left-side boundary 40-1 with respect to the travel direction of the mobile robot 30. The mobile robot 30 acquires the distance Z to the detected beacon 11-1 in order to maintain the certain distance Xref from the boundary 40-1, and calculates the beacon passing distance x on the basis of this distance Z. Based on the calculation result, the mobile robot 30 calculates δx, which is the difference between the certain distance Xref and the beacon passing distance x, and moves so that the difference δx is 0 (zero). The travel operation for setting the difference δx to 0 (zero) is determined on the basis of feedback control, for example, PID control. When the distance Z to the beacon 11-1 becomes closer than a predetermined switching threshold value, the mobile robot 30 switches the target to the beacon 11-2 and moves. The range in which the distance from the mobile robot 30 is closer than the switching threshold value is referred to as a switching range.

Figure 2:
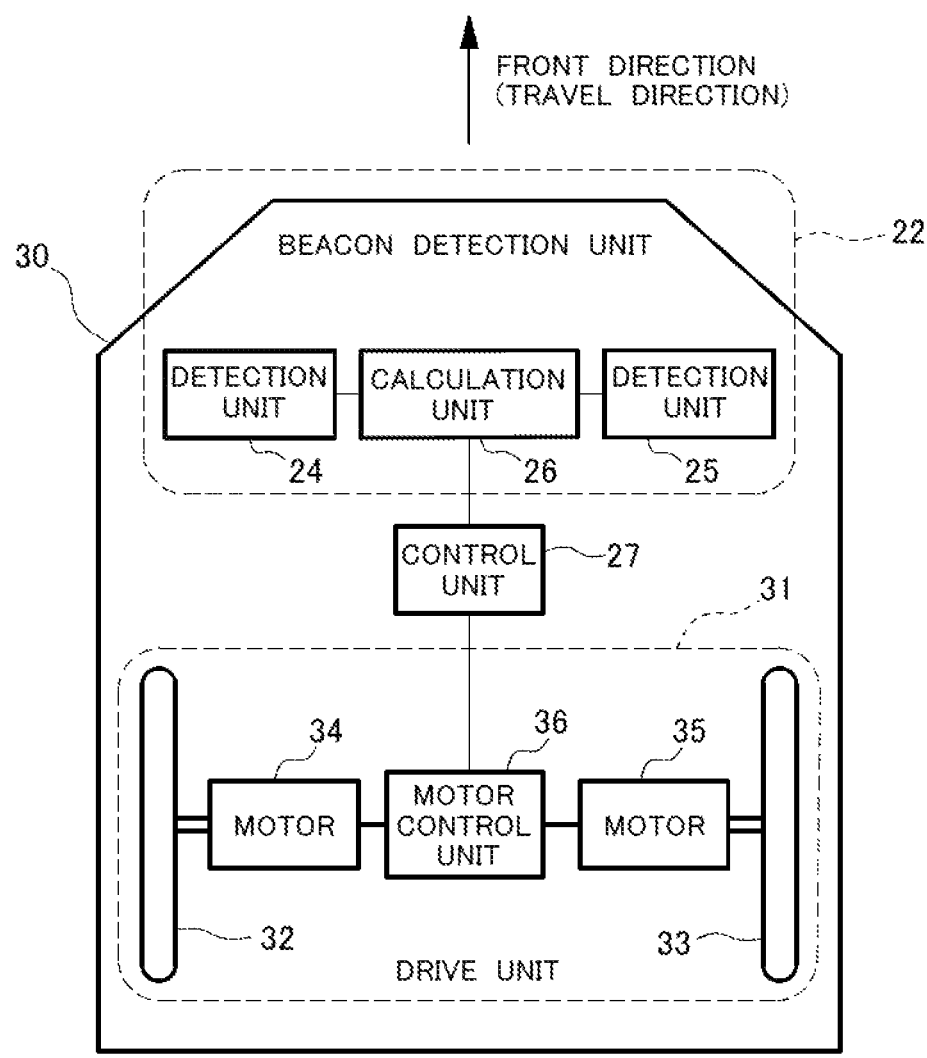
FIG. 2 is a block diagram illustrating a configuration example of a mobile robot according to the first embodiment.

Next, a specific configuration example of the mobile robot 30 according to the first embodiment will be described with reference to FIG. 2. Here, FIG. 2 is a block diagram illustrating a configuration example of the mobile robot 30 according to the first embodiment. The mobile robot 30 according to the first embodiment includes a drive unit 31, a beacon detection unit 22, and a control unit 27.

The drive unit 31 includes drive wheels 32 and 33, motors 34 and 35, and a motor control unit 36. The drive wheel 32 is provided on the left side with respect to the travel direction of the mobile robot 30. The drive wheel 33 is provided on the right side with respect to the travel direction of the mobile robot 30. The motor 34 rotates the drive wheel 32 according to the control of the motor control unit 36. The motor 35 rotates the drive wheel 33 according to the control of the motor control unit 36. The motor control unit 36 supplies electric power to the motors 34 and 35 on the basis of angular velocity command values for the motors 34 and 35 input from the control unit 27.

The mobile robot 30 moves forward or backward when the motors 34 and 35 rotate at angular velocities corresponding to the electric power supplied from the motor control unit 36. Further, the travel direction of the mobile robot 30 is changed by creating a difference in the angular velocities of the motors 34 and 35. For example, the mobile robot 30 moves while turning to the right when the angular velocity of the left-side drive wheel 32 is larger than the angular velocity of the right-side drive wheel 33 when the mobile robot 30 moves forward. Further, the mobile robot 30 turns without changing its position when the drive wheels 32 and 33 rotate in opposite directions. The mobile robot 30 may have wheels other than the drive wheels 32 and 33 in order to stabilize the posture of the mobile robot 30.

The beacon detection unit 22 includes infrared sensors 24 and 25 as detection units and a calculation unit 26. The infrared sensor 24 is attached to the left side of the front surface of the mobile robot 30 and detects an infrared signal transmitted from the beacon 11 located on the front surface side of the mobile robot 30. The infrared sensor 25 is attached to the right side of the front surface of the mobile robot 30 and detects an infrared signal transmitted from the beacon 11 located on the front surface side of the mobile robot 30. The two left and right infrared sensors 24 and 25 are attached to the housing of the mobile robot 30 symmetrically with respect to a straight line in the front direction passing through the center of the mobile robot 30. For the infrared sensors 24 and 25, for example, an image sensor combined with an infrared filter is used. The beacon 11 is detected by detecting a change in brightness of the images captured by the infrared sensors 24 and 25.

The calculation unit 26 calculates the distance Z from the mobile robot 30 to the beacon 11 on the basis of the difference between the position of the target beacon 11 in the image captured by one infrared sensor 24 and the position of the target beacon 11 in the image captured by the other infrared sensor 25. When the images captured by the infrared sensors 24 and 25 include signals transmitted from a plurality of beacons 11, the calculation unit 26 detects the beacon ID of the target beacon 11 and calculates the distance Z to the target beacon 11. The detection of the beacon ID is performed, for example, by detecting a periodic change in the signal corresponding to the beacon ID in images that are continuous in time series. The calculation unit 26 outputs beacon information including the calculated distance Z and the beacon ID to the control unit 27. The calculated distance Z is the distance from the center on the line segment connecting the infrared sensor 24 and the infrared sensor 25. If the infrared sensors 24 and 25 are attached so that the line segment connecting the infrared sensor 24 and the infrared sensor 25 is orthogonal to the travel direction of the mobile robot 30, the calculation load on the calculation unit 26 can be reduced.

Figure 3:
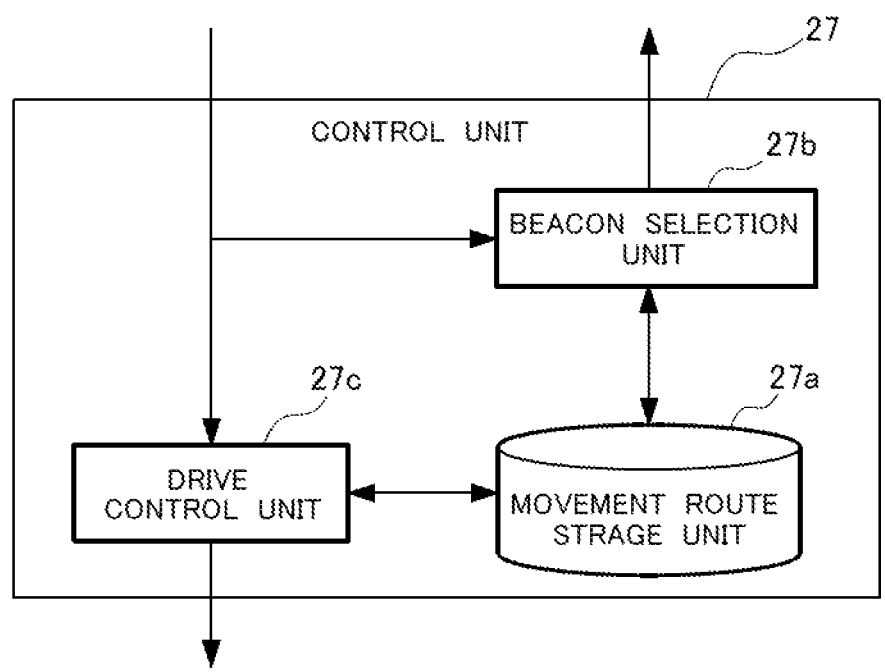
FIG. 3 is a block diagram illustrating a configuration example of a control unit according to the first embodiment.

The control unit 27 controls the drive unit 31 on the basis of the beacon information acquired from the beacon detection unit 22. FIG. 3 is a block diagram illustrating a configuration example of the control unit 27 according to the first embodiment. The control unit 27 according to the first embodiment includes a movement route storage unit 27a, a beacon selection unit 27b, and a drive control unit 27c. The movement route storage unit 27a stores in advance a table including attribute information regarding the plurality of beacons 11 arranged along the movement route of the mobile robot 30. The beacon selection unit 27b outputs the beacon ID of the target beacon 11 to the beacon detection unit 22 on the basis of the table stored in the movement route storage unit 27a. The beacon selection unit 27b determines whether or not to switch the target beacon 11 on the basis of the beacon information input from the beacon detection unit 22. When switching the target beacon 11, the beacon selection unit 27b selects the next beacon 11 of the current target beacon 11 from the table.

The drive control unit 27c reads the attribute information and the control information from the table stored in the movement route storage unit 27a on the basis of the beacon information output from the beacon detection unit 22. The attribute information is information on the target beacon 11. The control information is information indicating the control associated with the target beacon 11. The control associated with the beacon 11 is, for example, control of turning in the vicinity of the beacon 11 indicating a change in the travel direction, control of stopping in the vicinity of the beacon 11 indicating a stop position, and the like. That is, the drive control unit 27c drives and controls the drive unit 31 on the basis of the beacon information, the attribute information, and the control information.

FIG. 4 is a diagram illustrating an example of the table stored in the movement route storage unit 27a according to the first embodiment. The table includes columns for items such as "beacon ID", "pathway distance", "installation side", "change of direction", and "last beacon". Each row is attribute information stored for each beacon 11. The rows in the table are arranged in the order of the beacons 11 that the mobile robot 30 passes through when moving along the movement route. The column of "beacon ID" includes the beacon ID of the beacon 11 corresponding to the row. The column of "pathway distance" includes the distance information indicating how far the beacon 11 corresponding to the row and the movement route of the mobile robot 30 are from each other. The pathway distance is a value set as a positive value, and is a value indicating the distance from the target beacon 11 to the movement route of the mobile robot 30. Further, in this embodiment, the pathway distance indicates the distance from the beacon 11 to the target point located in a direction substantially orthogonal to the moving direction in the movement route of the mobile robot 30.

The column of "installation side" includes information indicating whether the beacon 11 corresponding to the row is arranged on the right side or the left side of the mobile robot 30 when the mobile robot 30 moves along the movement route. The column of "change of direction" includes rotation information indicating change in the travel direction of the mobile robot 30 when the mobile robot 30 approaches the beacon 11 corresponding to the row by a predetermined distance or a switching threshold value. When the rotation information is 0 degrees, it indicates that the travel direction of the mobile robot 30 has not changed. When the rotation information is other than 0 degrees, the travel direction of the mobile robot 30 is changed clockwise or counterclockwise by the angle indicated by the rotation information. The column of "last beacon" includes information indicating whether the beacon 11 corresponding to the row is a beacon 11 in the vicinity of the target point in the movement route. In the table illustrated in FIG. 4, for example, the beacon 11 having the beacon ID "M" is illustrated as a beacon in the vicinity of the target point.

Figure 5:
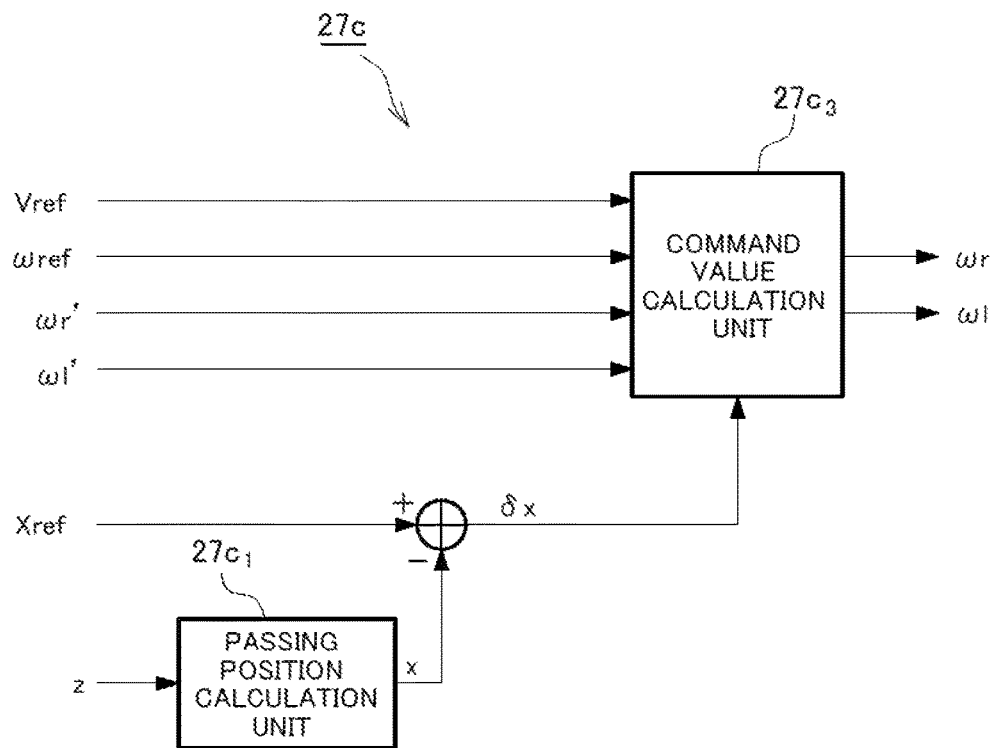
FIG. 5 is a block diagram illustrating a configuration example related to control based on beacon information in a drive control unit according to the first embodiment.

FIG. 5 is a block diagram illustrating a configuration example related to control based on beacon information in the drive control unit $27c$ according to the first embodiment. The drive control unit $27c$ includes a passing position calculation unit $27c_1$ and a command value calculation unit $27c_3$. The distance Z to the beacon 11 included in the beacon information is input to the passing position calculation unit $27c_1$. The passing position calculation unit $27c_1$ calculates the distance x to the beacon 11 on the basis of the distance Z when the mobile robot 30 moves in the current travel direction and approaches closest to the beacon 11. The position when the mobile robot 30 approaches closest to the beacon 11 is the intersection of a straight line orthogonal to the moving straight line extending in the travel direction from the position of the mobile robot 30 and passing through the position of the beacon 11, and the moving straight line. The distance x is obtained as (Z·sin θ). The distance x is also referred to as a beacon passing distance.

A translational velocity command value Vref, an angular velocity command value ωref, measured angular velocities ωl' and ωr', and a difference δx are input to the command value calculation unit $27c_3$. The translational velocity command value Vref is a command value (target value) for the translational velocity of the mobile robot 30. The angular velocity command value ωref is the angular velocity when the travel direction is changed in the clockwise direction or the counterclockwise direction with respect to the travel direction. For the angular velocity command value ωref, the amount of change in the clockwise direction may be set as a positive value, or the amount of change in the counterclockwise direction may be set as a positive value. The measured angular velocities ωl' and ωr' are the angular velocities measured by the encoders provided in the motors 34 and 35, respectively. The command value calculation unit $27c_3$ can calculate the angular velocity command values ωl and ωr for outputting to the drive unit 31 by the control unit 27 executing PID control based on the difference δx, and can control the operation of the drive unit 31.

Next, the drive control method of the mobile robot 30 according to the first embodiment will be described with reference to FIG. 6. Here, FIG. 6 is a diagram for explaining the operation of the mobile robot 30 according to the first embodiment.

In the first embodiment, the beacon detection unit 22 of the mobile robot 30 detects the beacon 11-1 arranged on the boundary 40-1, whereby the distance Z from the mobile robot 30 to the beacon 11 is obtained. As described above, this distance Z is a value calculated by the calculation unit 26. In the control unit 27 to which the calculated value of the distance Z is transmitted, the passing position calculation unit $27c_1$ calculates the beacon passing distance x from the distance Z. The beacon passing distance x is a distance in a direction orthogonal to the movement route between the beacon 11-1 arranged along the boundary 40-1 and the current position of the mobile robot 30. The mobile robot 30 can grasp the target route L indicated by a broken line by grasping a passing point Ppass at a certain distance Xref away from the beacon 11-1 arranged along the movement route. The passing point Ppass is determined on the basis of the information indicating the "installation side" in the attribute information of the beacon 11. Note that FIG. 6 illustrates a case where the beacon 11 (11-1, 11-2) is set on the left side of the movement route.

Figure 6:
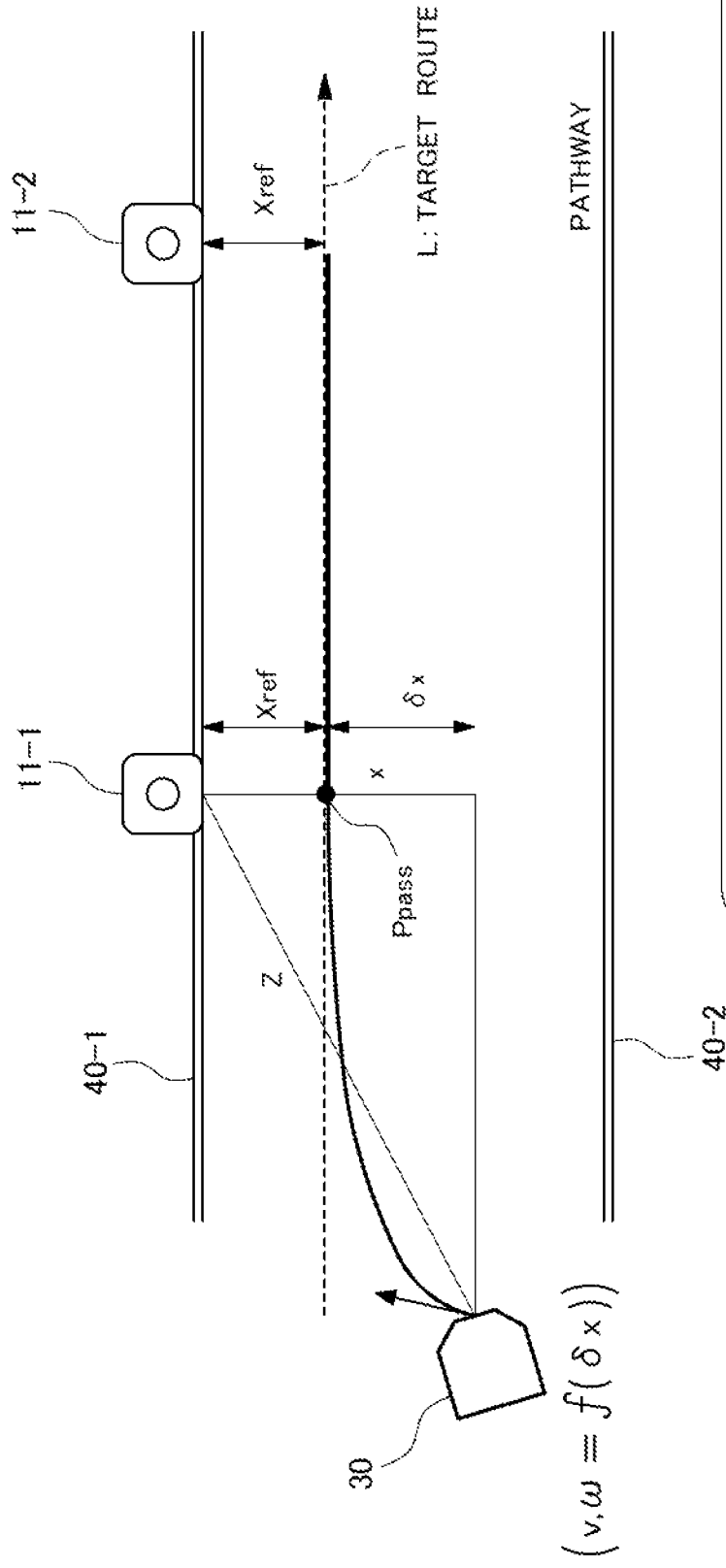
FIG. 6 is a diagram for explaining the operation of the mobile robot according to the first embodiment.

In the example illustrated in FIG. 6, when the mobile robot 30 tries to start moving along the target route L toward the target point, the control unit 27 calculates the difference δx, which is the difference between the beacon passing distance x and the certain distance Xref on the basis of the beacon passing distance x calculated by the passing position calculation unit $27c_1$ from the distance Z and the certain distance Xref, which is a predetermined distance from the beacon 11 in order to define the target route L. The information on the calculated difference δx is transmitted to the command value calculation unit $27c_3$. The command value calculation unit $27c_3$ executes drive control for the drive unit 31 so that the received difference δx is 0 (zero). At this time, the command value calculation unit $27c_3$ executes the drive control for the drive unit 31 by calculating the angular velocity command values ωl and ωr on the basis of the PID control so that the difference δx is 0 (zero).

The operation command information calculated by the command value calculation unit $27c_3$ is, for example, based on PID control, which is one of the control methods included in feedback control. Here, PID control is a control method that combines proportional operation (P operation), integral operation (I operation), and differential operation (D operation), and is a control method that controls an input value on the basis of three elements of deviation between an output value and a target value, its integral, and its differentiation. Since the control unit 27 (command value calculation unit $27c_3$) executes the drive control for the drive unit 31 according to such PID control so that the difference δx is 0 (zero), the mobile robot 30 always operates so as to approach the target route L more quickly when performing the movement operation. Further, by the action of the differential operation (D operation) of the PID control, the mobile robot 30 is suitably prevented from going too far (overshooting) or vibrating (hunting) with respect to the target route L, which is the movement target. Therefore, it is possible to move the mobile robot 30 to the target route L at an early stage by following a route drawing a smooth curvature.

When the mobile robot 30 moves along the movement route according to the drive control method described above, the mobile robot 30 will finally approach the vicinity of the beacon 11 having the beacon ID "M" close to the target position, and stop control will be executed.

Figure 7:
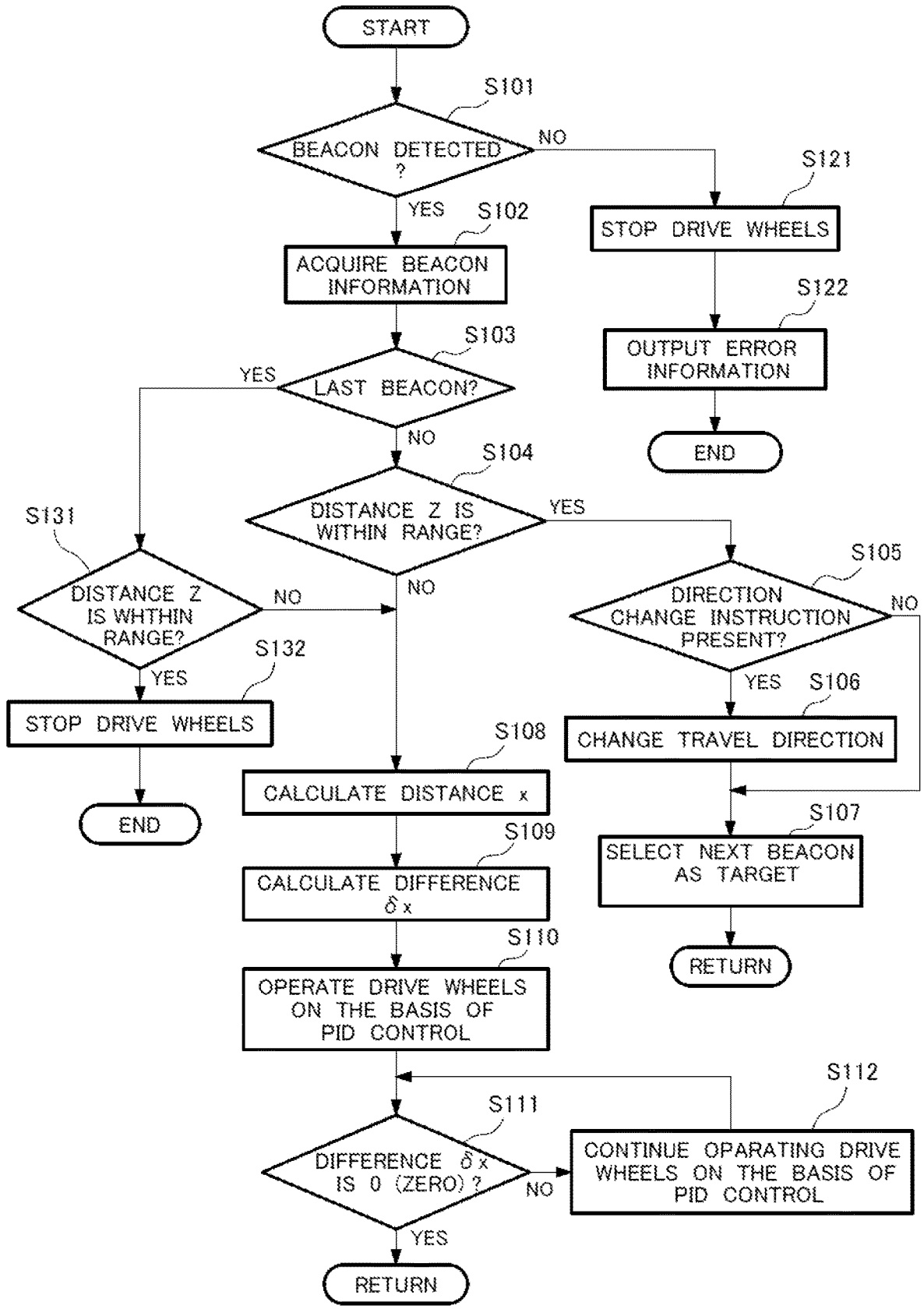
FIG. 7 is a diagram for explaining the operation of the mobile robot according to the first embodiment, and is a flowchart illustrating the content of control processing by the control unit.

Next, with reference to FIG. 7, specific processing content in a control system of the mobile robot 30 according to the first embodiment will be described. Here, FIG. 7 is a diagram for explaining the operation of the mobile robot 30 according to the first embodiment, and is a flowchart illustrating the content of control processing by the control unit.

When the movement of the mobile robot 30 is started, first, the calculation unit 26 acquires the ID information set in the beacon 1I and transmits the same to the control unit 27. The ID information in the first embodiment is a beacon ID for uniquely identifying each beacon 11. The control unit 27 that has received the beacon ID determines whether the beacon ID set in the initial state can be detected (step S101). In the initial state, the beacon selection unit 27b selects the beacon ID stored in the first row of the table as the beacon ID of the target beacon 11.

If the beacon 11 could not be detected (NO in step S101), the control unit 27 outputs an error signal indicating that the beacon 11 could not be detected. The drive control unit 27c causes the drive unit 31 to stop the drive wheels 32 and 33 in response to the error signal (step S121). The beacon selection unit 27b outputs error information indicating that the beacon 11 could not be detected to the outside in response to the error signal (step S122), and ends the movement control process. The error information is output using an output device, for example, a speaker or a display, provided in the mobile robot 30.

If the beacon 11 can be detected in step S101 (YES in step S101), the beacon selection unit 27b and the drive control unit 27c will acquire the beacon information from the calculation unit 26 of the beacon detection unit 22 (step S102). The beacon selection unit 27b determines whether the beacon 11 indicated by the beacon information is the last beacon on the basis of the table (step S103).

In step S103, when the beacon 11 is the last beacon (YES in step S103), the drive control unit 27c determines whether the distance Z to the beacon 11 indicated by the beacon information is within the switching range (step S131). When the distance Z to the beacon 11 is within the switching range (YES in step S131), the drive control unit 27c causes the drive unit 31 to stop the drive wheels 32 and 33 (step S132), and ends the movement control process.

In step S131, if the distance Z to the beacon 11 is not within the switching range (NO in step S131), the drive control unit 27c causes the process to proceed to step S108.

In step S103, when the beacon 11 is not the last beacon (NO in step S103), the drive control unit 27c determines whether the distance Z to the beacon 11 indicated by the beacon information is within the switching range (step S104). When the distance Z to the beacon 11 is not within the switching range (NO in step S104), the drive control unit 27c causes the process to proceed to step S108.

In step S104, when the distance Z to the beacon 11 is within the switching range (YES in step S104), the drive control unit 27c determines whether there is a direction change instruction in the attribute information of the beacon 11 on the basis of the table (step S105). If there is no direction change instruction (NO in step S105), the drive control unit 27c causes the process to proceed to step S107.

When there is a direction change instruction (YES in step S105), the drive control unit 27c acquires the rotation information of the beacon 11 from the table and controls the drive unit 31 so that the travel direction of the mobile robot 30 is changed by the angle indicated by the rotation information (step S106). The beacon selection unit 27b acquires the beacon ID of the next target beacon 11 of the current target beacon 11 from the table. By outputting the beacon 11 having the acquired beacon ID to the beacon detection unit 22, the beacon selection unit 27b selects the beacon 11 having the acquired beacon ID as a new target (step S107), and the process returns to step S101.

In step S108, in the control unit 27 that has acquired the beacon information including the distance Z, the passing position calculation unit $27c_1$ calculates the beacon passing distance x from the distance Z (step S108). The distance x is a distance in a direction orthogonal to the movement route between the beacon 11-1 arranged along the boundary 40-1 and the current position of the mobile robot 30. Further, the control unit 27 calculates the difference δx which is the difference between the distance x and the certain distance Xref on the basis of the calculated beacon passing distance x and the certain distance Xref, which is the distance from the beacon 11-1 set in advance in order to define the target route L (step S109).

Subsequently, the information on the difference δx calculated in step S109 is transmitted from the passing position calculation unit $27c_1$ of the control unit 27 to the command value calculation unit $27c_3$. The command value calculation unit $27c_3$ executes drive control for the drive unit 31 so that the received difference δx is 0 (zero) (step S110). At this time, the command value calculation unit $27c_3$ calculates the angular velocity command values ωl and ωr on the basis of the PID control so that the difference δx is 0 (zero), whereby the drive control for the drive unit 31 is executed.

After the command value calculation unit 270 of the control unit 27 executes the drive control for the drive unit 31 so that the difference δx is 0 (zero), the control unit 27 continues determining whether the difference δx is 0 (zero) (step S111). Then, when the difference δx is not 0 (zero) (NO in step S111), the control unit 27 continues executing the drive control for the drive unit 31 based on the PID control (step S112).

When the difference δx becomes 0 (zero) after the execution of the drive control for the drive unit 31 based on the PID control by the control unit 27 is continued (YES in step S111), the control unit 27 returns the process to step S101. Then, the movement control process based on the flowchart illustrated in FIG. 7 is executed until the mobile robot 30 reaches the last target point and the process of step S132 of stopping the drive wheels 32 and 33 is executed by the drive unit 31.

As described above, according to the movement control process described with reference to FIG. 7, the mobile robot 30 according to the first embodiment is quickly guided to the desired target route L in the pathway by the action of PID control (see FIG. 6). In such an operation control method, for example, when persons share a pathway with the mobile robot 30 in a plant or the like, the mobile robot 30 can quickly open the pathway. Thus, the mobile robot 30 will not obstruct the passing of persons, and the occurrence of a situation in which a person has to wait for the passing of the mobile robot 30 in a pathway can be suitably prevented.

According to the control system of the mobile robot 30 according to the first embodiment described above, even when a relatively compact beacon 11 that does not require a wide installation space is adopted, the identification and distance measurement can be performed with high accuracy. Further, according to the control system of the mobile robot 30 according to the first embodiment described above, since an inexpensive system configuration can be adopted, it is possible to provide a highly versatile mobile robot control system.

The first embodiment, which is the basic embodiment of the mobile robot control system according to the present invention, has been described with reference to FIGS. 1 to 7. The first embodiment described above is an embodiment in which the mobile robot 30 operates on the basis of the distance Z to the beacon 11-1 detected by the mobile robot 30 and the beacon passing distance x calculated on the basis of this distance Z. Next, a second embodiment, which is an operation control method combined with another operation control method while using the operation control method of the first embodiment described above in the initial operation of the mobile robot 30 will be described with reference to FIGS. 8 to 17. In the description of the second embodiment, members and the like that are the same as or similar to those of the first embodiment described above may be denoted by the same reference numerals and the description thereof may be omitted.

Second Embodiment

Figure 8:
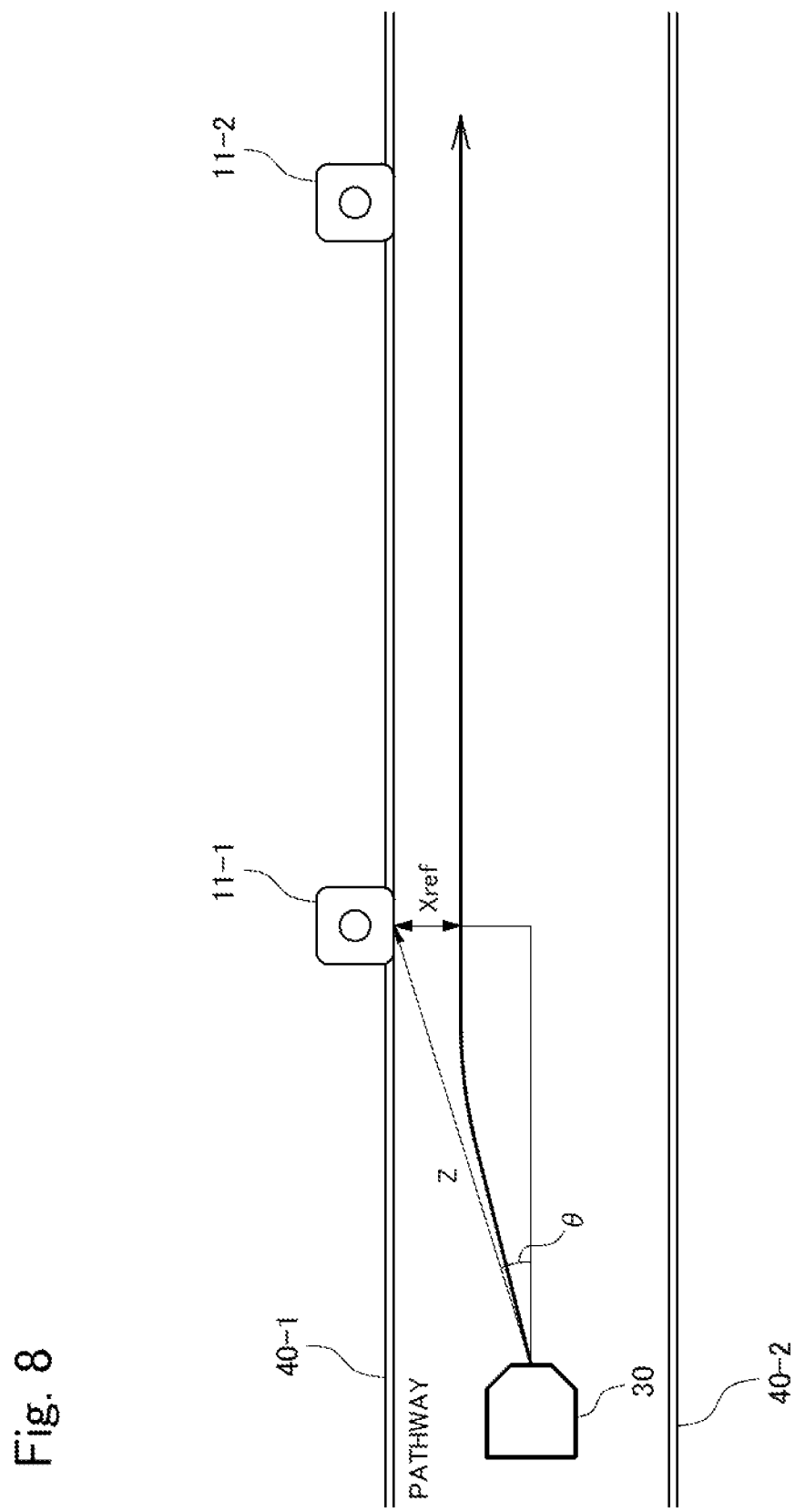
FIG. 8 is a diagram illustrating a basic movement example of a mobile robot according to a second embodiment.

FIG. 8 is a diagram illustrating a basic movement example of the mobile robot 30 according to the second embodiment. The mobile robot 30 detects a beacon 11 (11-1, 11-2) as a detection target object arranged along a boundary 40 (40-1, 40-2) that defines a pathway, and moves toward a target point while maintaining a certain distance Xref from the boundary 40 on the basis of the position of the detected beacon 11. A beacon ID that uniquely identifies each of the beacons 11 is assigned to the beacon 11 as a transmitter. The beacon 11 transmits, for example, an infrared signal including a signal indicating a beacon ID, and is represented by a periodic change in the infrared signal. The boundary 40 that defines the pathway is, for example, a wall, a partition, a white line, or the like.

In the movement example illustrated in FIG. 8, the mobile robot 30 moves while maintaining a certain distance Xref from the left-side boundary 40-1 with respect to the travel direction of the mobile robot 30. The mobile robot 30 acquires the distance Z and direction θ to the detected beacon 11-1 in order to maintain the certain distance Xref from the boundary 40-1, and calculates a travel direction in which the distance Z and the direction θ satisfy predetermined conditions. The mobile robot 30 moves in the calculated travel direction. The direction θ is an angle formed between the travel direction of the mobile robot 30 and the direction of the detected beacon 11-1. The travel direction satisfying the predetermined conditions is the travel direction determined on the basis of feedback control, for example, PID control in the initial operation, and is the travel direction in which the direction θ is arcsin(Xref/Z) in a state where the mobile robot has finished the initial operation and transitioned to a normal operation. When the distance Z to the beacon 11-1 becomes closer than the predetermined switching threshold value, the mobile robot 30 switches the target to the beacon 11-2 and moves. The range in which the distance from the mobile robot 30 is closer than the switching threshold value is referred to as a switching range.

Figure 9:
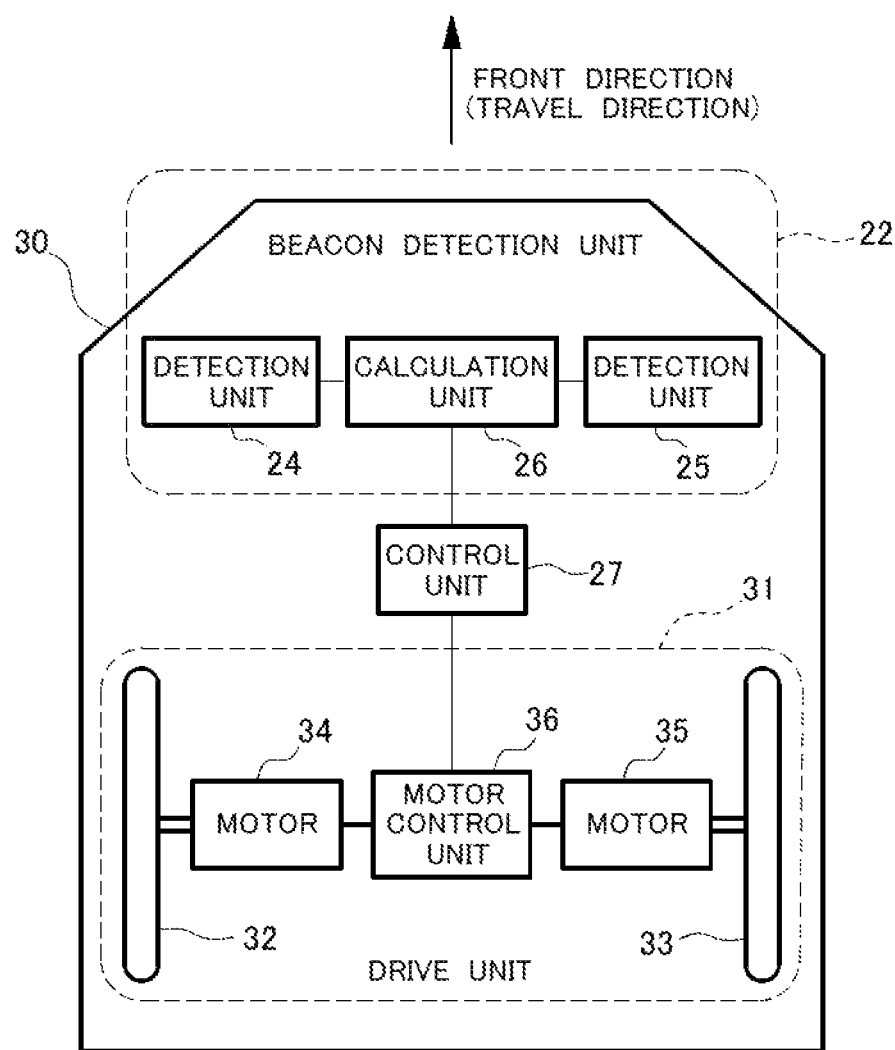
FIG. 9 is a block diagram illustrating a configuration example of the mobile robot according to the second embodiment.

Next, a specific configuration example of the mobile robot 30 according to the second embodiment will be described with reference to FIG. 9. Here, FIG. 9 is a block diagram illustrating a configuration example of the mobile robot 30 according to the second embodiment. The mobile robot 30 according to the second embodiment includes a drive unit 31, a beacon detection unit 22, and a control unit 27.

The drive unit 31 includes drive wheels 32 and 33, motors 34 and 35, and a motor control unit 36. The drive wheel 32 is provided on the left side with respect to the travel direction of the mobile robot 30. The drive wheel 33 is provided on the right side with respect to the travel direction of the mobile robot 30. The motor 34 rotates the drive wheel 32 according to the control of the motor control unit 36. The motor 35 rotates the drive wheel 33 according to the control of the motor control unit 36. The motor control unit 36 supplies electric power to the motors 34 and 35 on the basis of angular velocity command values for the motors 34 and 35 input from the control unit 27.

The mobile robot 30 moves forward or backward when the motors 34 and 35 rotate at angular velocities corresponding to the electric power supplied from the motor control unit 36. Further, the travel direction of the mobile robot 30 is changed by creating a difference in the angular velocities of the motors 34 and 35. For example, the mobile robot 30 moves while turning to the right when the angular velocity of the left-side drive wheel 32 is larger than the angular velocity of the right-side drive wheel 33 when the mobile robot 30 moves forward. Further, the mobile robot 30 turns without changing its position when the drive wheels 32 and 33 rotate in opposite directions. The mobile robot 30 may have wheels other than the drive wheels 32 and 33 in order to stabilize the posture of the mobile robot 30.

The beacon detection unit 22 includes infrared sensors 24 and 25 as detection units and a calculation unit 26. The infrared sensor 24 is attached to the left side of the front surface of the mobile robot 30 and detects an infrared signal transmitted from the beacon 11 located on the front surface side of the mobile robot 30. The infrared sensor 25 is attached to the right side of the front surface of the mobile robot 30 and detects an infrared signal transmitted from the beacon 11 located on the front surface side of the mobile robot 30. The two left and right infrared sensors 24 and 25 are attached to the housing of the mobile robot 30 symmetrically with respect to a straight line in the front direction passing through the center of the mobile robot 30. For the infrared sensors 24 and 25, for example, an image sensor combined with an infrared filter is used. The beacon 11 is detected by detecting a change in brightness of the images captured by the infrared sensors 24 and 25.

The calculation unit 26 calculates the distance Z and the direction θ from the mobile robot 30 to the beacon 11 on the basis of the difference between the position of the target beacon 11 in the image captured by one infrared sensor 24 and the position of the target beacon 11 in the image captured by the other infrared sensor 25. When the images captured by the infrared sensors 24 and 25 include signals transmitted from a plurality of beacons 11, the calculation unit 26 detects the beacon ID of the target beacon 11 and calculates the distance Z and the direction θ to the target beacon 11. The detection of the beacon ID is performed, for example, by detecting a periodic change in the signal corresponding to the beacon ID in images that are continuous in time series. The calculation unit 26 outputs beacon information including the calculated distance Z and direction θ and the beacon ID to the control unit 27. The calculated distance Z is the distance from the center on the line segment connecting the infrared sensor 24 and the infrared sensor 25. If the infrared sensors 24 and 25 are attached so that the line segment connecting the infrared sensor 24 and the infrared sensor 25 is orthogonal to the travel direction of the mobile robot 30, the calculation load on the calculation unit 26 can be reduced.

Figure 10:
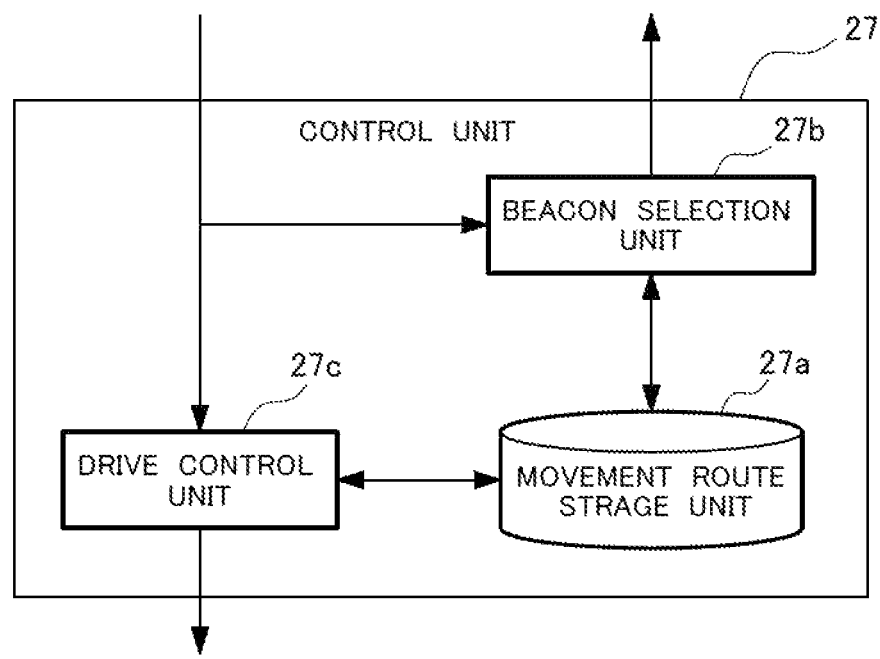
FIG. 10 is a block diagram illustrating a configuration example of a control unit according to the second embodiment.

The control unit 27 controls the drive unit 31 on the basis of the beacon information acquired from the beacon detection unit 22. FIG. 10 is a block diagram illustrating a configuration example of the control unit 27 according to the second embodiment. The control unit 27 according to the second embodiment includes a movement route storage unit 27a, a beacon selection unit 27b, and a drive control unit 27c. The movement route storage unit 27a stores in advance a table including attribute information regarding the plurality of beacons 11 arranged along the movement route of the mobile robot 30. The beacon selection unit 27b outputs the beacon ID of the target beacon 11 to the beacon detection unit 22 on the basis of the table stored in the movement route storage unit 27a. The beacon selection unit 27b determines whether or not to switch the target beacon 11 on the basis of the beacon information input from the beacon detection unit 22. When switching the target beacon 11, the beacon selection unit 27b selects the next beacon 11 of the current target beacon 11 from the table.

The drive control unit 27c reads the attribute information and the control information from the table stored in the movement route storage unit 27a on the basis of the beacon information output from the beacon detection unit 22. The attribute information is information on the target beacon 11. The control information is information indicating the control associated with the target beacon 11. The control associated with the beacon 11 is, for example, control of turning in the vicinity of the beacon 11 indicating a change in the travel direction, control of stopping in the vicinity of the beacon 11 indicating a stop position, and the like. That is, the drive control unit 27c drives and controls the drive unit 31 on the basis of the beacon information, the attribute information, and the control information.

FIG. 11 is a diagram illustrating an example of the table stored in the movement route storage unit 27a according to the second embodiment. The table includes columns for items such as "beacon ID", "pathway distance", "installation side", "change of direction", and "last beacon". Each row is attribute information stored for each beacon 11. The rows in the table are arranged in the order of the beacons 11 that the mobile robot 30 passes through when moving along the movement route. The column of "beacon ID" includes the beacon ID of the beacon 11 corresponding to the row. The column of "pathway distance" includes the distance information indicating how far the beacon 11 corresponding to the row and the movement route of the mobile robot 30 are from each other. The pathway distance is a value set as a positive value, and is a value indicating the distance from the target beacon 11 to the movement route of the mobile robot 30. Further, in this embodiment, the pathway distance indicates the distance from the beacon 11 to the target point located in a direction substantially orthogonal to the moving direction in the movement route of the mobile robot 30.

The column of "installation side" includes information indicating whether the beacon 11 corresponding to the row is arranged on the right side or the left side of the mobile robot 30 when the mobile robot 30 moves along the movement route. The column of "change of direction" includes rotation information indicating change in the travel direction of the mobile robot 30 when the mobile robot 30 approaches the beacon 11 corresponding to the row by a predetermined distance or a switching threshold value. When the rotation information is 0 degrees, it indicates that the travel direction of the mobile robot 30 has not changed. When the rotation information is other than 0 degrees, the travel direction of the mobile robot 30 is changed clockwise or counterclockwise by the angle indicated by the rotation information. The column of "last beacon" includes information indicating whether the beacon 11 corresponding to the row is a beacon 11 in the vicinity of the target point in the movement route.

In the table illustrated in FIG. 11, for example, the beacon 11 having the beacon ID "M" is illustrated as a beacon in the vicinity of the target point.

Figure 12:
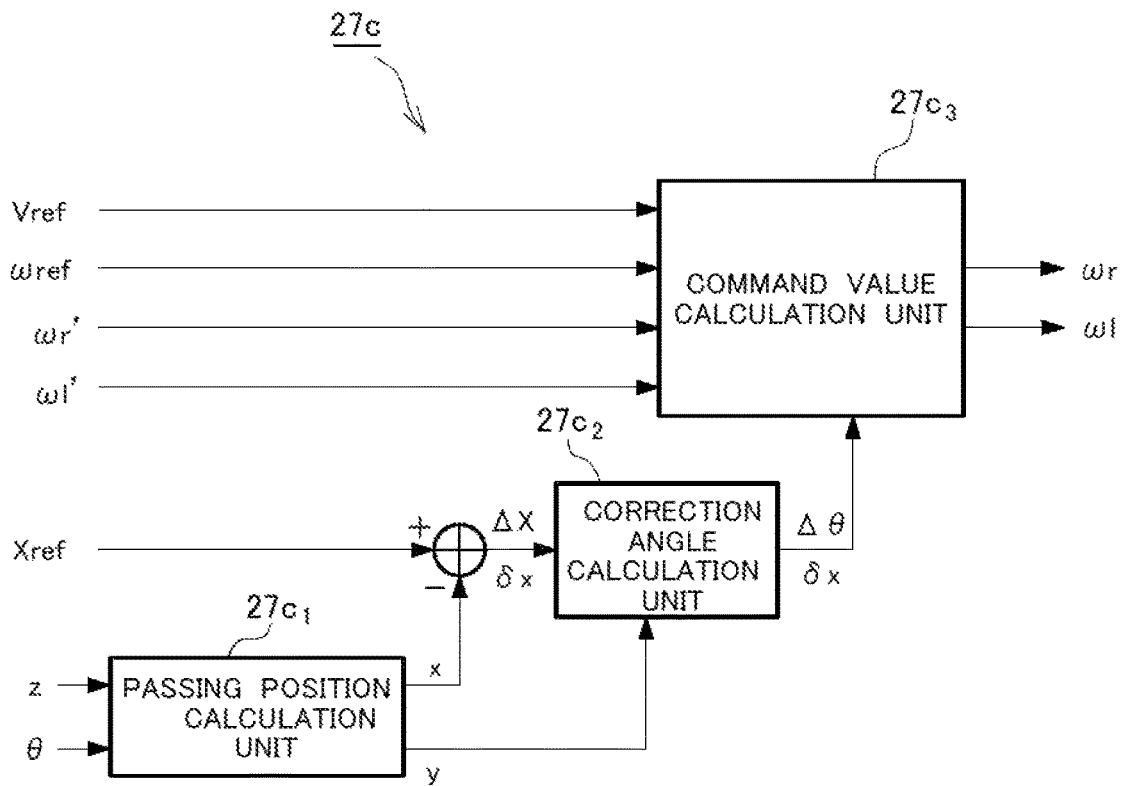
FIG. 12 is a block diagram illustrating a configuration example related to control based on beacon information in a drive control unit according to the second embodiment.

FIG. 12 is a block diagram illustrating a configuration example related to control based on beacon information in the drive control unit 27c according to the second embodiment. The drive control unit 27c includes a passing position calculation unit $27c_1$, a correction angle calculation unit $27c_2$, and a command value calculation unit $27c_3$. The distance Z and the direction θ to the beacon 11 included in the beacon information are input to the passing position calculation unit $27c_1$. The passing position calculation unit $27c_1$ calculates the distance x to the beacon 11 when the mobile robot 30 moves in the current travel direction and approaches closest to the beacon 11 and a moving distance y until the mobile robot 30 approaches closest to the beacon 11 on the basis of the distance Z and the direction θ. The position when the mobile robot 30 approaches closest to the beacon 11 is the intersection of a straight line orthogonal to the moving straight line extending in the travel direction from the position of the mobile robot 30 and passing through the position of the beacon 11, and the moving straight line. The distance x is obtained as (Z·sin θ). The moving distance y is obtained as (Z·cos θ). The distance x is also referred to as a beacon passing distance. Moreover, the moving distance y is also referred to as a horizontal distance to the beacon.

The difference ΔX obtained by subtracting the distance x from the certain distance Xref from the boundary 40 of the pathway to the movement route and the moving distance y are input to the correction angle calculation unit $27c_2$. The correction angle calculation unit $27c_2$ calculates a correction angle Δθ with respect to the travel direction of the mobile robot 30 on the basis of the difference ΔX and the moving distance y. Specifically, the correction angle calculation unit $27c_2$ sets the value obtained by arctan(ΔX/y) as the correction angle Δθ.

A translational velocity command value Vref, an angular velocity command value ωref, measured angular velocities ωl' and ωr', the correction angle Δθ, and the difference δx are input to the command value calculation unit $27c_3$. The translational velocity command value Vref is a command value (target value) for the translational velocity of the mobile robot 30. The angular velocity command value ωref is the angular velocity when the travel direction is changed in the clockwise direction or the counterclockwise direction with respect to the travel direction. For the angular velocity command value ωref, the amount of change in the clockwise direction may be set as a positive value, or the amount of change in the counterclockwise direction may be set as a positive value. The measured angular velocities ωl' and ωr' are the angular velocities measured by the encoders provided in the motors 34 and 35, respectively. The command value calculation unit $27c_3$ calculates the angular velocity command values ωl and ωr for changing the travel direction by the correction angle Δθ while allowing the mobile robot 30 to move according to the translational velocity command value Vref and the angular velocity command value ωref on the basis of the translational velocity command value Vref, the angular velocity command value ωref, the measured angular velocities ωl' and ωr', and the correction angle Δθ. The command value calculation unit $27c_3$ outputs the calculated angular velocity command values ωl and ωr to the drive unit 31.

The command value calculation unit $27c_3$ can calculate the angular velocity command values ωl and ωr for outputting to the drive unit 31 by the control unit 27 executing PID control based on the difference δx, and can control the operation of the drive unit 31.

In the second embodiment, different drive control methods are executed between an initial operation in which the mobile robot 30 tries to start moving along the target route L toward the target point and a normal operation in which the mobile robot 30 finishes the initial operation and continues moving along the target route L. Therefore, the drive control method of the mobile robot 30 according to the second embodiment will be described with reference to FIGS. 13 and 15.

Figure 13:
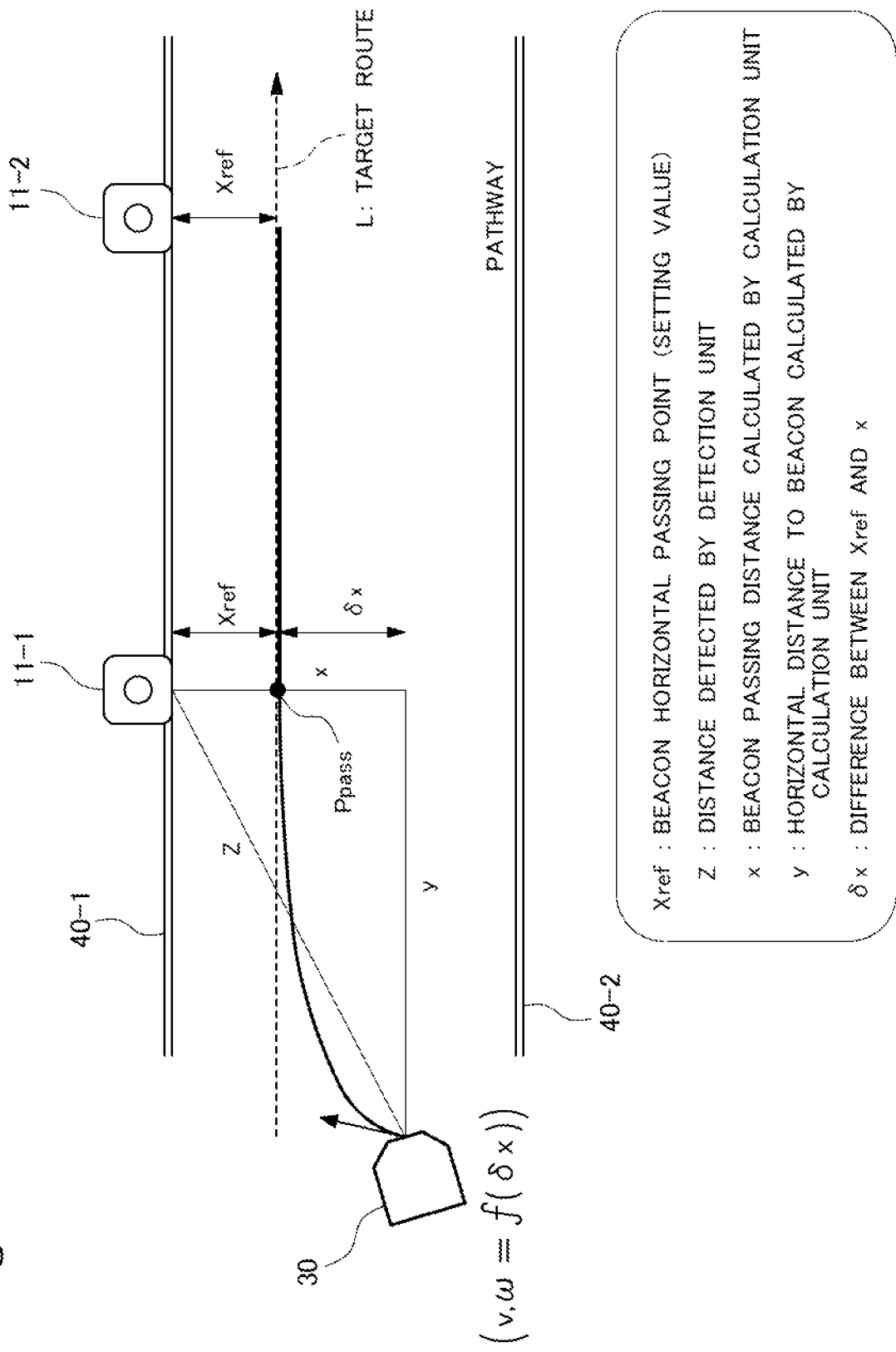
FIG. 13 is a diagram for explaining an operation when the mobile robot according to the second embodiment executes an initial operation.

First, FIG. 13 is a diagram for explaining an operation when the mobile robot 30 according to the second embodiment executes an initial operation. When the beacon detection unit 22 detects the beacon 11-1 arranged on the boundary 40-1, the distance Z from the mobile robot 30 to the beacon 11 and the direction θ in which the beacon 11-1 is located with reference to the travel direction of the mobile robot 30 are obtained. As described above, these distance Z and direction θ are values calculated by the calculation unit 26. In the control unit 27 to which the calculated values including the distance Z and the direction θ are transmitted, the passing position calculation unit $27c_1$ calculates the distance x and the moving distance y from the distance Z and the direction θ. The distance x is a distance in a direction orthogonal to the movement route between the beacon 11-1 arranged along the boundary 40-1 and the current position (start position) of the mobile robot 30. The mobile robot 30 can grasp the target route L indicated by a broken line by grasping the passing point Ppass at a certain distance Xref away from the beacon 11-1 arranged along the movement route. The passing point Ppass is determined on the basis of the information indicating the "installation side" in the attribute information of the beacon 11. Note that FIG. 13 illustrates a case where the beacon 11 (11-1, 11-2) is set on the left side of the movement route.

In the example illustrated in FIG. 13, when the mobile robot 30 tries to start moving along the target route L toward the target point, the control unit 27 calculates the difference δx, which is the difference between the distance x and the certain distance Xref on the basis of the distance x calculated by the passing position calculation unit $27c_1$ from the distance Z and the direction θ, and the certain distance Xref, which is a predetermined distance from the beacon 11 in order to define the target route L. The information on the calculated difference δx is transmitted to the command value calculation unit $27c_3$ via the correction angle calculation unit $27c_2$. At this time, the correction angle calculation unit $27c_2$ does not operate and only passes the information on the difference δx. The command value calculation unit $27c_3$ executes drive control for the drive unit 31 so that the received difference δx is 0 (zero). At this time, the command value calculation unit $27c_3$ executes the drive control for the drive unit 31 by calculating the angular velocity command values ωl and ωr on the basis of the PID control so that the difference δx is 0 (zero).

The operation command information calculated by the command value calculation unit $27c_3$ is, for example, based on PID control, which is one of the control methods included in feedback control. Here, PID control is a control method that combines proportional operation (P operation), integral operation (I operation), and differential operation (D operation), and is a control method that controls an input value on the basis of three elements of deviation between an output value and a target value, its integral, and its differentiation. Since the control unit 27 (command value calculation unit $27c_3$) executes the drive control for the drive unit 31 according to such PID control so that the difference δx is 0 (zero), the mobile robot 30 operates so as to approach the target route L more quickly in the initial operation. Further, by the action of the differential operation (D operation) of the PID control, the mobile robot 30 is suitably prevented from going too far (overshooting) or vibrating (hunting) with respect to the target route L, which is the movement target. Therefore, it is possible to move the mobile robot 30 to the target route L at an early stage by following a route drawing a smooth curvature.

Figure 15:
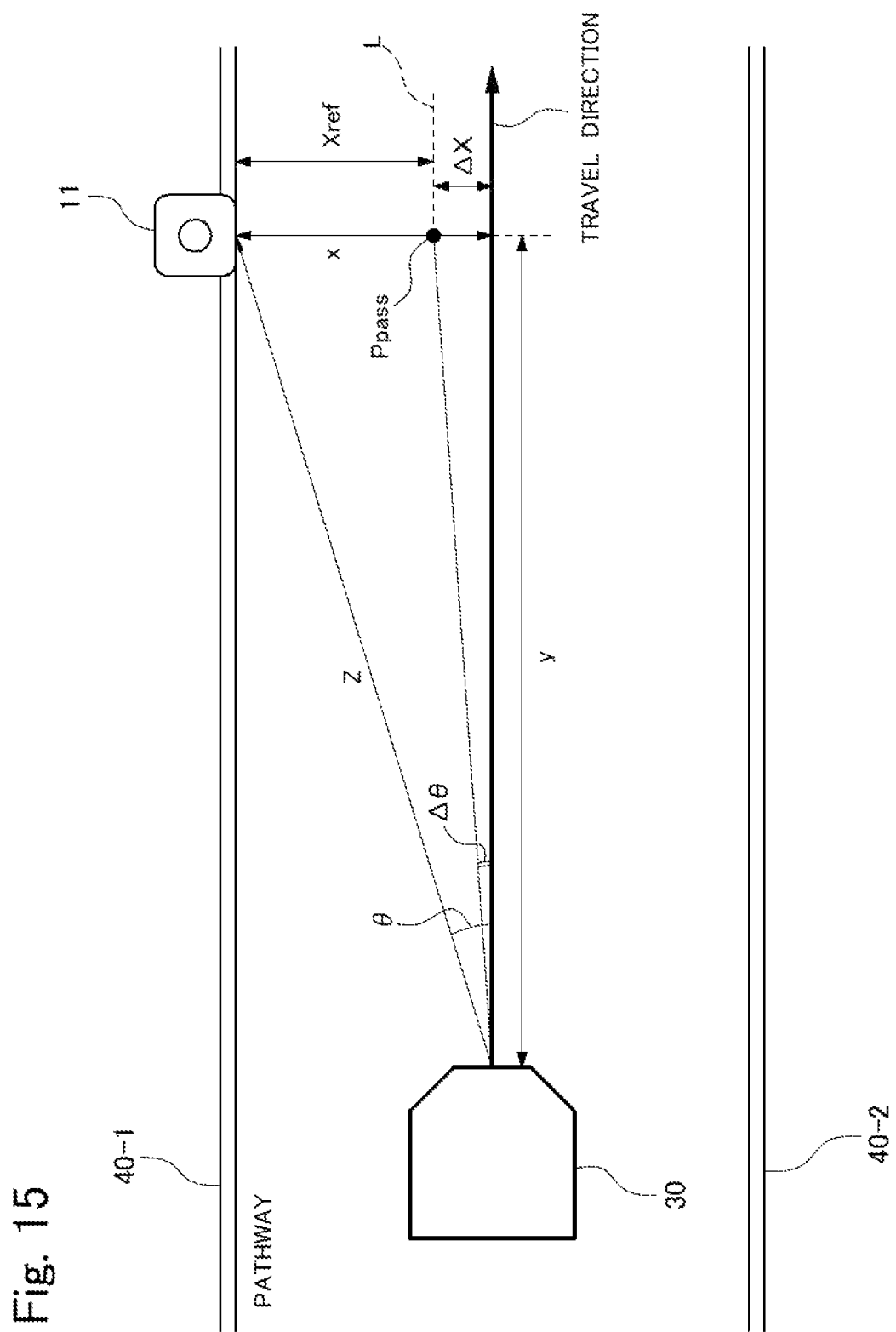
FIG. 15 is a diagram for explaining an operation when the mobile robot according to the second embodiment executes a normal operation.

On the other hand, FIG. 15 is a diagram for explaining an operation when the mobile robot 30 according to the second embodiment executes a normal operation. Note that FIG. 15 illustrates the correction angle Δθ calculated by the drive control unit 27c according to the second embodiment. When the beacon detection unit 22 detects the beacon 11 arranged on the boundary 40-1, the distance Z from the mobile robot 30 to the beacon 11 and the direction θ in which the beacon 11 is located with reference to the travel direction of the mobile robot 30 are obtained. The passing position calculation unit $27c_1$ calculates the distance x and the moving distance y from the distance Z and the direction θ. The mobile robot 30 needs to change the travel direction in order to pass through the passing point Ppass which is away from the beacon 11 arranged along the movement route by the certain distance Xref. The passing point Ppass is determined on the basis of the information indicating the "installation side" in the attribute information of the beacon 11. Note that FIG. 15 illustrates a case where the beacon 11 is set on the left side of the movement route.

In the example illustrated in FIG. 15, when the mobile robot 30 moves while maintaining the current travel direction, the mobile robot 30 passes through a position away from the passing point Ppass by the difference ΔX. Therefore, the correction angle calculation unit $27c_2$ calculates the correction angle Δθ with respect to the travel direction on the basis of the difference ΔX and the moving distance y. The command value calculation unit $27c_3$ calculates the angular velocity command values ωl and ωr for changing the travel direction counterclockwise by the correction angle Δθ while moving the mobile robot 30 according to the translational velocity command value Vref and the angular velocity command value ωref and controls the drive unit 31. By the drive control unit 27c controlling the drive unit 31 in this way, the mobile robot 30 can move on the target route L defined at a position away from the boundary 40-1 of the pathway by the certain distance Xref.

Figure 16:
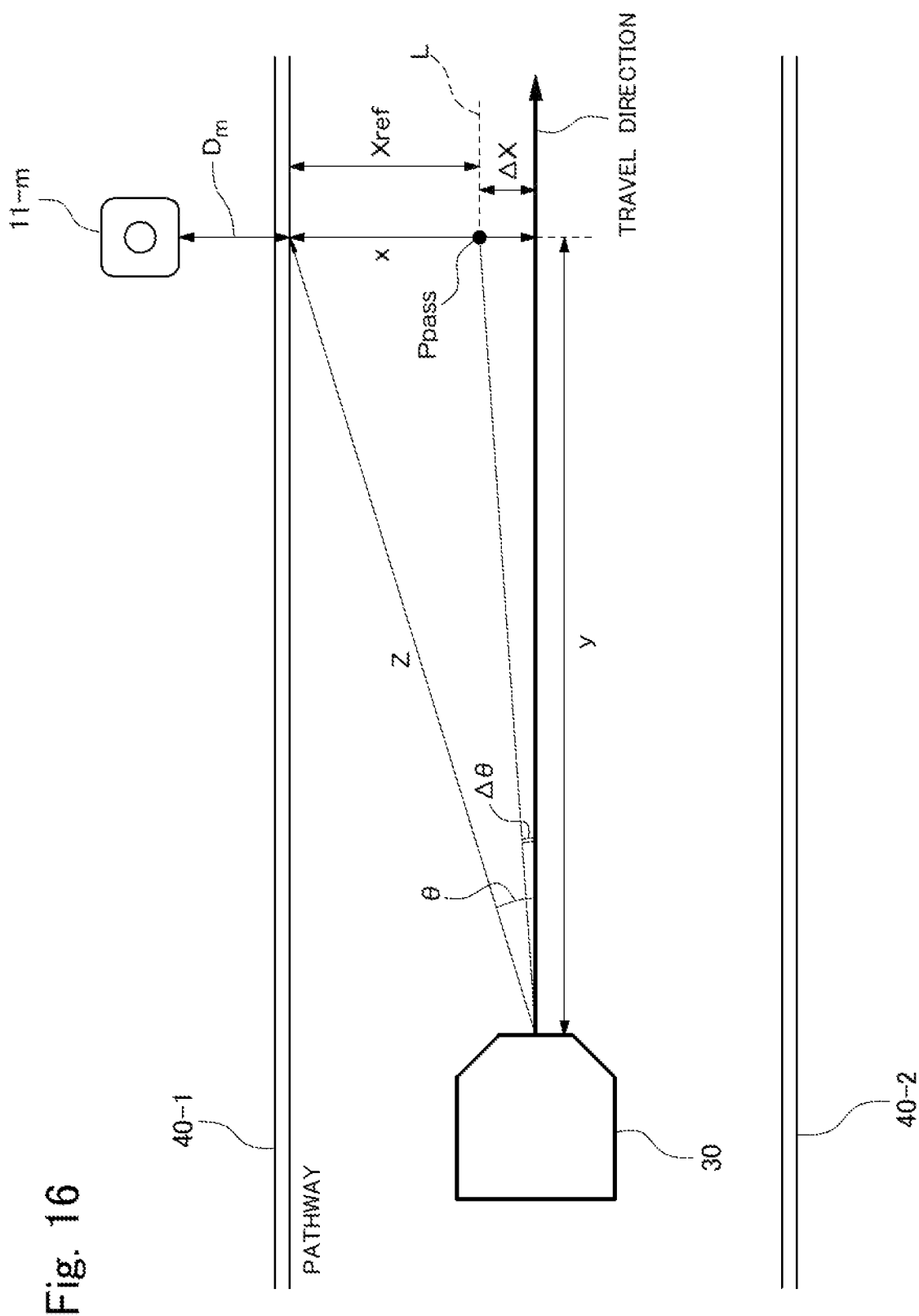
FIG. 16 is a diagram illustrating an operation example when the mobile robot according to the second embodiment executes a normal operation when the beacon could not be arranged on a boundary.

In the example illustrated in FIG. 15, the case where the beacon 11 is arranged on the boundary 40-1 has been described. However, when the beacon 11 could not be arranged on the boundary 40, the difference between the position where the beacon 11 is arranged and the boundary 40 is stored in a table as a pathway distance ($D_1, D_2, \ldots, D_m, \ldots, D_M$). An example of such a state is illustrated in FIG. 16. Here, FIG. 16 is a diagram illustrating an operation example when the mobile robot 30 according to the second embodiment executes a normal operation when the beacon 11 (11-m) could not be arranged on the boundary 40 (40-1). In this case, the correction angle calculation unit $27c_2$ corrects either the certain distance Xref or the difference ΔX using the pathway distance $D_m$ when calculating the correction angle Δθ.

When the mobile robot 30 moves along the movement route according to the drive control method described above, the mobile robot 30 finally approaches the vicinity of the beacon 11 having the beacon ID "M" close to the target position, and stop control will be executed.

Figure 14:
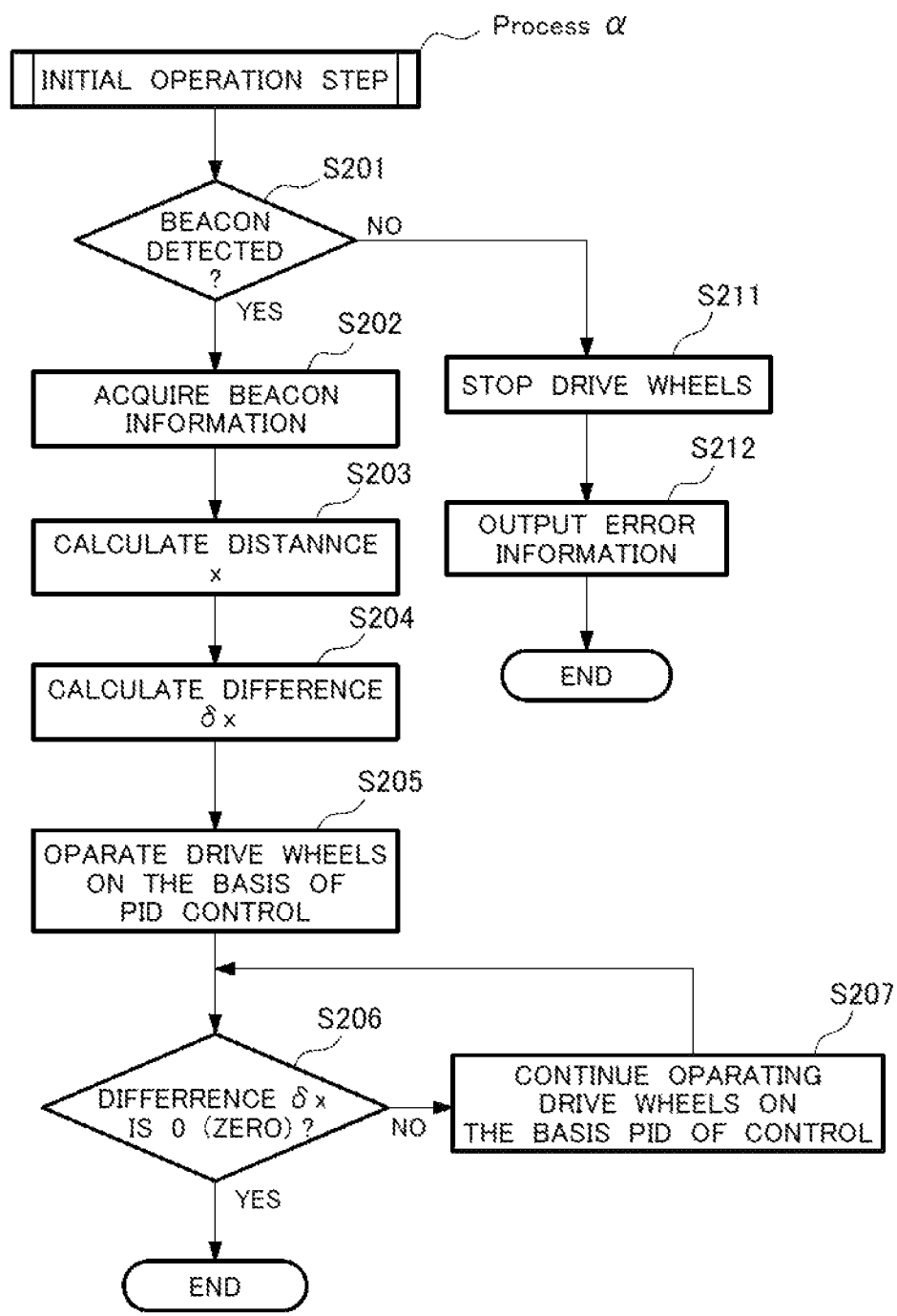
FIG. 14 is a diagram for explaining an operation when the mobile robot according to the second embodiment executes an initial operation, and is a flowchart illustrating the content of control processing by the control unit.
Figure 17:
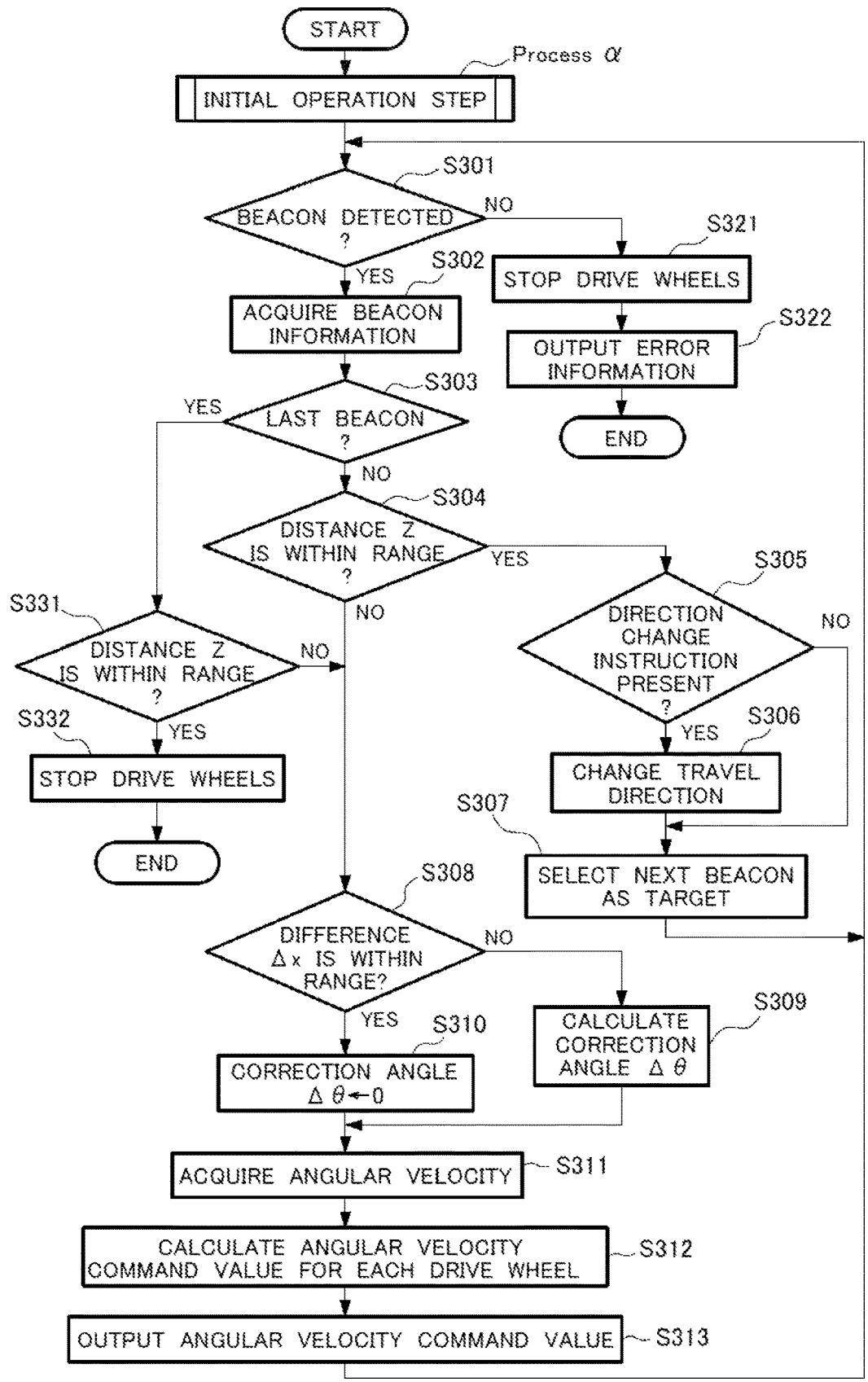
FIG. 17 is a diagram for explaining an operation when the mobile robot according to the second embodiment executes a normal operation, and is a flowchart illustrating the content of control processing by the control unit.

Next, with reference to FIGS. 14 and 17, specific processing content in the control system of the mobile robot 30 according to the second embodiment will be described. Here, FIG. 14 is a diagram for explaining an operation when the mobile robot 30 according to the second embodiment executes an initial operation, and is a flowchart illustrating the content of control processing by the control unit. Further, FIG. 17 is a diagram for explaining an operation when the mobile robot 30 according to the second embodiment executes a normal operation, and is a flowchart illustrating the content of control processing by the control unit.

First, in an initial operation step (Process cc) executed in the initial operation of the mobile robot 30 according to the second embodiment illustrated in FIG. 14, the calculation unit 26 acquires the ID information set to the beacon 11-1, calculates the distance Z from the mobile robot 30 to the beacon 11-1 and the direction θ in which the beacon 11-1 is located with reference to the travel direction of the mobile robot 30, and transmits the information indicating the distance Z and direction θ to the control unit 27. The ID information in the second embodiment is a beacon ID for uniquely identifying each beacon 11. The control unit 27 that has received the beacon ID determines whether the beacon ID set in the initial state can be detected (step S201). In the initial state, the beacon selection unit 27b selects the beacon ID stored in the first row of the table as the beacon ID of the target beacon 11-1.

If the beacon 11-1 could not be detected (NO in step S201), the control unit 27 outputs an error signal indicating that the beacon 11-1 could not be detected. The drive control unit 27c causes the drive unit 31 to stop the drive wheels 32 and 33 in response to the error signal (step S211). The beacon selection unit 27b outputs error information indicating that the beacon 11 could not be detected to the outside in response to the error signal (step S212), and ends the movement control process. The error information is output using an output device, for example, a speaker or a display, provided in the mobile robot 30.

If the beacon 11 can be detected in step S201 (YES in step S201), the beacon selection unit 27b and the drive control unit 27c will acquire the beacon information from the calculation unit 26 of the beacon detection unit 22 (step S202). This beacon information is information indicating the distance Z from the mobile robot 30 to the beacon 11-1 and the direction θ in which the beacon 11-1 is located with reference to the travel direction of the mobile robot 30.

In the control unit 27 that has acquired the beacon information including the distance Z and the direction θ, the passing position calculation unit $27c_1$ calculates the distance x from the distance Z and the direction θ (step S203). The distance x is a distance in a direction orthogonal to the movement route between the beacon 11-1 arranged along the boundary 40-1 and the current position (start position) of the mobile robot 30. Further, the control unit 27 calculates the difference δx which is the difference between the distance x and the certain distance Xref on the basis of the calculated distance x and the certain distance Xref which is the distance from the beacon 11-1 set in advance in order to define the target route L (step S204).

Subsequently, the information on the difference δx calculated in step S204 is transmitted from the passing position calculation unit $27c_1$ of the control unit 27 to the command value calculation unit $27c_3$ via the correction angle calculation unit $27c_2$. At this time, the correction angle calculation unit $27c_2$ does not operate and only passes the information on the difference δx. The command value calculation unit $27c_3$ executes drive control for the drive unit 31 so that the received difference δx is 0 (zero) (step S205). At this time, the command value calculation unit $27c_3$ calculates the angular velocity command values ωl and ωr on the basis of the PID control so that the difference δx is 0 (zero), whereby the drive control for the drive unit 31 is executed.

After the command value calculation unit 2703 of the control unit 27 executes the drive control for the drive unit 31 so that the difference δx is 0 (zero), the control unit 27 continues determining whether the difference δx is 0 (zero) (step S206). Then, when the difference δx is not 0 (zero) (NO in step S206), the control unit 27 continues executing the drive control for the drive unit 31 based on the PID control (step S207).

When the difference δx becomes 0 (zero) after the execution of the drive control for the drive unit 31 based on the PID control by the control unit 27 is continued (YES in step S206), the control unit 27 ends the initial operation step (Process α) based on the PID control, and subsequently, the normal operation illustrated in FIG. 17 is executed.

As described above, according to the initial operation step (Process α) described with reference to FIG. 14, the mobile robot 30 according to the second embodiment is quickly guided to the desired target route L in the pathway by the action of PID control (see FIG. 13). In such an operation control method, for example, when persons share a pathway with the mobile robot 30 in a plant or the like, the mobile robot 30 can quickly open the pathway. Thus, the mobile robot 30 will not obstruct the passing of persons, and the occurrence of a situation in which a person has to wait for the passing of the mobile robot 30 in a pathway can be suitably prevented.

As described above, when the movement of the mobile robot 30 is started, first, the initial operation step (Process α) described with reference to FIG. 14 is executed. By execution of this initial operation step (Process α), the mobile robot 30 moves on the target route L and transitions to the normal operation. That is, as illustrated in FIG. 17, when the initial operation step (Process α) ends, the calculation unit 26 acquires the ID information set to the beacon 11 and transmits the same to the control unit 27. The ID information in the second embodiment is a beacon ID for uniquely identifying each beacon 11. The control unit 27 that has received the beacon ID determines whether the beacon ID set in the initial state can be detected (step S301). In the initial state, the beacon selection unit 27b selects the beacon ID stored in the first row of the table as the beacon ID of the target beacon 11.

If the beacon 11 could not be detected (NO in step S301), the control unit 27 outputs an error signal indicating that the beacon 11 could not be detected. The drive control unit 27c causes the drive unit 31 to stop the drive wheels 32 and 33 in response to the error signal (step S321). The beacon selection unit 27b outputs error information indicating that the beacon 11 could not be detected to the outside in response to the error signal (step S322), and ends the movement control process. The error information is output using an output device, for example, a speaker or a display, provided in the mobile robot 30.

If the beacon 11 can be detected in step S301 (YES in step S301), the beacon selection unit 27b and the drive control unit 27c will acquire the beacon information from the calculation unit 26 of the beacon detection unit 22 (step S302). The beacon selection unit 27b determines whether the beacon 11 indicated by the beacon information is the last beacon on the basis of the table (step S303).

In step S303, when the beacon 11 is the last beacon (YES in step S303), the drive control unit 27c determines whether the distance Z to the beacon 11 indicated by the beacon information is within the switching range (step S331). When the distance Z to the beacon 11 is within the switching range (YES in step S331), the drive control unit 27c causes the drive unit 31 to stop the drive wheels 32 and 33 (step S332), and ends the movement control process.

In step S331, if the distance Z to the beacon 11 is not within the switching range (NO in step S331), the drive control unit 27c causes the process to proceed to step S308.

In step S303, when the beacon 11 is not the last beacon (NO in step S303), the drive control unit 27c determines whether the distance Z to the beacon 11 indicated by the beacon information is within the switching range (step S304). When the distance Z to the beacon 11 is not within the switching range (NO in step S304), the drive control unit 27c causes the process to proceed to step S308.

In step S304, when the distance Z to the beacon 11 is within the switching range (YES in step S304), the drive control unit 27c determines whether there is a direction change instruction in the attribute information of the beacon 11 on the basis of the table (step S305). If there is no direction change instruction (NO in step S305), the drive control unit 27c causes the process to proceed to step S307.

When there is a direction change instruction (YES in step S305), the drive control unit 27c acquires the rotation information of the beacon 11 from the table and controls the drive unit 31 so that the travel direction of the mobile robot 30 is changed by the angle indicated by the rotation information (step S306). The beacon selection unit 27b acquires the beacon ID of the next target beacon 11 of the current target beacon 11 from the table. By outputting the beacon 11 having the acquired beacon ID to the beacon detection unit 22, the beacon selection unit 27b selects the beacon 11 having the acquired beacon ID as a new target (step S307), and the process returns to step S301.

In step S308, the correction angle calculation unit $27c_2$ determines whether the difference ΔX calculated on the basis of the beacon information acquired from the beacon detection unit 22 is within an allowable range (step S308). The allowable range for the difference ΔX is determined in advance on the basis of the accuracy of movement required for the mobile robot 30, the accuracy of detection of the beacon 11 in the beacon detection unit 22, the accuracy of the control of the motors 34 and 35, and the like. When the difference ΔX is not within the allowable range (NO in step S308), the correction angle calculation unit $27c_2$ calculates the correction angle Δθ on the basis of the difference ΔX (step S309). When the difference ΔX is within the allowable range (YES in step S308), the correction angle calculation unit $27c_2$ sets the correction angle Δθ to 0 (step S310).

After that, the command value calculation unit $27c_3$ acquires the measured angular velocities ωl' and ωr' of the motors 34 and 35 that drive the drive wheels 32 and 33 (step S311). The command value calculation unit $27c_3$ calculates the angular velocity command values ωl and ωr for the motors 34 and 35 on the basis of the translational velocity command value Vref, the angular velocity command value ωref, the measured angular velocities ωl' and ωr', and the correction angle Δθ (step S312). The command value calculation unit $27c_3$ outputs the angular velocity command values ωl and ωr to the drive unit 31 (step S313), and the process returns to step S301.

By the control unit 27 performing the control process including each process from the initial operation step (Process α) to step S332 described above, it is possible to acquire the distance Z and the direction θ to the beacon 11 sequentially and correct the travel direction. Since the travel direction is corrected by such control process, the mobile robot 30 can move on the movement route away from the boundary 40 by the certain distance Xref, and reduce the moving distance when the mobile robot 30 moves on the basis of a plurality of beacons 11.

According to the control system of the mobile robot 30 according to the second embodiment, even when a relatively compact beacon 11 that does not require a wide installation space is adopted, the identification and distance measurement can be performed with high accuracy. Further, according to the control system of the mobile robot 30 according to the second embodiment, since an inexpensive system configuration can be adopted, it is possible to provide a highly versatile mobile robot control system.

Although the preferred embodiments of the present invention have been described above, the technical scope of the present invention is not limited to the scope described in the above embodiments. Various changes or improvements can be made to the above embodiments.

Figure 18:
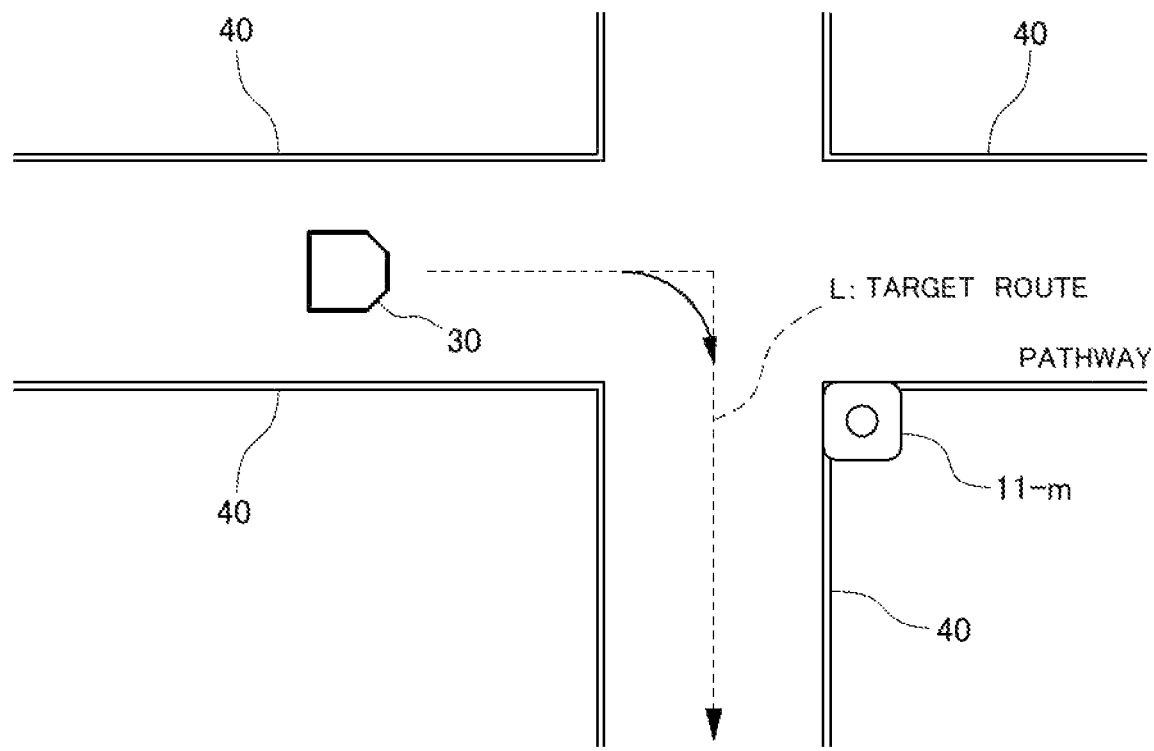
FIG. 18 is a diagram illustrating an arrangement example of beacons and the state of a target route when an intersection is present in a pathway in which a mobile robot moves.

For example, in the second embodiment described above, an example is illustrated in which the drive control for the drive unit 31 based on the PID control by the control unit 27 is executed as the initial operation step (Process α). However, a scene in which the PID control is performed on the mobile robot 30 so that the difference δx becomes 0 (zero) can be applied not only to the initial operation but also to other operations. Specifically, FIG. 18 is a diagram illustrating an arrangement example of the beacons 11 and the state of the target route L when an intersection is present in the pathway where the mobile robot 30 moves. As illustrated in FIG. 18, when the beacon 11-m is installed at one corner close to the travel direction change destination side among the two corners on the far side of the intersection when viewed from the mobile robot 30, the mobile robot 30 moves up to a position where the distance Z to the beacon 11-m is within the switching range and changes the travel direction by turning the angle indicated by the rotation information in the normal operation where the PID control is not performed. Therefore, the mobile robot 30 will move along the target route L indicated by a broken line in the drawing. However, if PID control is performed at the position immediately before entering the intersection, the mobile robot 30 makes a right turn movement following the route illustrated by a solid line in the drawing. Therefore, the movement control of the mobile robot 30 can be performed along an efficient movement route.

Further, for example, in the second embodiment described above, an example is illustrated in which the drive control for the drive unit 31 based on the PID control by the control unit 27 is executed as the initial operation step (Process α), and a case is illustrated in which in this initial operation step (Process α), PID control is performed on the mobile robot 30 so that the difference δx is 0 (zero). However, regarding the PID control according to the present invention, the PID control may be performed such that the difference δx reaches a predetermined threshold value in addition to the case where the difference δx is set to 0 (zero). Such a modification is also applicable to the first embodiment described above. That is, in the present invention, the overall movement control of the mobile robot including the transition control from the initial operation to the normal operation may be executed under various conditions.

Further, for example, in the first and second embodiments described above, an infrared signal is used for the beacon 11, but the scope of the present invention is not limited to this. When a member which uses a marker that does not emit a signal may be adopted as the detection target object according to the present invention, the same effects as those of the first and second embodiments described above can be obtained.

Further, for example, a plurality of markers that do not transmit signals may be used instead of the transmitters such as the plurality of beacons 11 that transmit signals. When a marker is used, a marker detection unit is used instead of the beacon detection unit 22. The marker detection unit may operate in the same manner as the beacon detection unit 22 by detecting a geometric figure or a combination of colors provided on each marker. An ID that identifies the marker may be included in the geometric figure or the combination of colors. As the geometric figure, for example, a QR code (registered trademark) may be used.

Further, for example, instead of the beacon 11 that actively transmits a signal, a marker using an RFID element that transmits a response signal in response to a signal transmitted from the mobile robot 30 or a marker using an element that reflects a signal transmitted from the mobile robot 30 may be arranged. When a marker that performs a passive operation is used, the mobile robot 30 is provided with a transmitter that transmits a predetermined signal. As described above, the detection target object such as the beacon 11 or the marker may be any element as long as it can detect the relative position of the mobile robot 30.

Figure 20:
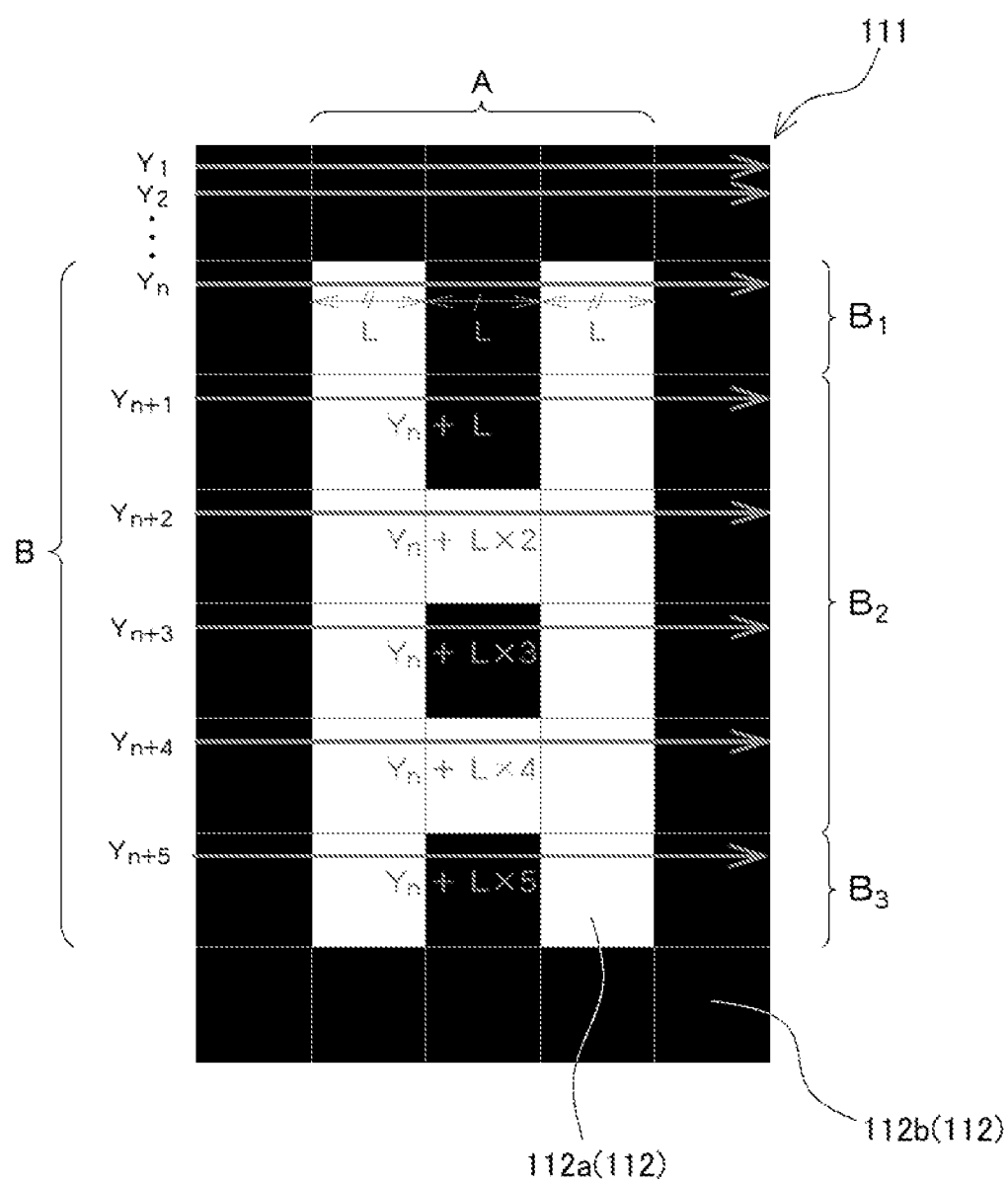
FIG. 20 illustrates a binarized image obtained by binarizing the image data of a marker imaged by the image processing device applicable to the mobile robot according to the present invention, and is a diagram for explaining a scanning method for scanning the binarized image to obtain ID information set in the marker.

Here, a specific example when a marker is used for the detection target object according to the present invention will be described with reference to FIGS. 19 and 20. FIG. 19 is a block diagram illustrating a system configuration example of an image processing device applicable to the mobile robot according to the present invention. Further, FIG. 20 illustrates a binarized image obtained by binarizing the image data of a marker imaged by the image processing device applicable to the mobile robot according to the present invention, and is a diagram for explaining a scanning method for scanning the binarized image to obtain ID information set in the marker.

An image processing device 110 illustrated in FIG. 19 includes a marker 111 as a detection target object and an image processing device body 121 that acquires desired information by reading the marker 111 and executes processing.

The marker 111 is configured by arranging a plurality of square cells 112 on a two-dimensional plane. The plurality of cells 112 are composed of, for example, white cells 112a as a first cell that can reflect infrared LED light and black cells 112b as a second cell that cannot reflect infrared LED light. In the case of the embodiment illustrated in FIG. 19, fourteen white cells 112a and twenty-six black cells 112b are arranged on a two-dimensional plane in a matrix arrangement of five columns and eight rows. Further, in the marker 111, the twenty-two black cells 112b arranged so as to surround the outer periphery of the marker 111 do not include information, and are portions that function as a simple boundary for distinguishing the marker 111 and the space and preventing erroneous reading. That is, the portion of the marker 111 illustrated in FIG. 19 that functions as a detection target object is composed of a matrix arrangement of eighteen cells 112 of three columns and six rows including three columns indicated by reference numeral A and six rows indicated by reference numeral B.

In the portion configured as a matrix arrangement of three columns and six rows functioning as a detection target object in the marker 111, for example, the portion indicated by reference numeral $B_1$ located in the first row of the uppermost row is configured as a "detection start position", the portion indicated by reference numeral $B_3$ located on the sixth row of the lowermost row is configured as a "detection end position", and the portion indicated by reference numeral $B_2$ composed of four rows of the second row to the fifth row sandwiched between the detection start position $B_1$ and the detection end position is configured as an "ID information assigning position".

Regarding the detection start position $B_1$ and the detection end position $B_3$, for example, the cells 112 are arranged in the order of "white, black, white" from the left side to the right side of the sheet of FIG. 19, which can be represented as "1, 0, 1" in binary codes where white is "1" and black is "0 (zero)". By causing the image processing device body 121 to recognize the information of "1, 0, 1", it can be recognized that the first row and the last row of the marker 111 have been successfully read. That is, by recognizing the detection start position $B_1$ and the detection end position $B_3$ represented by "1, 0, 1", the ID information assigning position $B_2$ of the four rows that may exist between them can be accurately recognized.

Regarding the ID information assigning position $B_2$ of the four rows, the cells 112 are arranged in the order of "white, black, white", "white, white, white", "white, black, white", "white, white, white", from the top row to the bottom row, which can be represented as "1, 0, 1", "1, 1, 1", "1, 0, 1", "1, 1, 1" in binary codes. By giving the marker 111 the information having such a configuration of 3 bits×4 rows, it is possible to assign a total of 12 bits of ID information to the ID information assigning position $B_2$. Then, by causing the image processing device body 121 to recognize the 12-bit information, various processes can be executed.

As described above, when the detection start position $B_1$ and the detection end position $B_3$ are read successfully and the ID information assigning position $B_2$ existing between them is read, the ID information can be acquired without erroneous recognition.

Among the plurality of cells 112, the white cells 112a are made of a material capable of reflecting the infrared LED light emitted from an irradiation unit 123 described later and causing imaging units 124 and 125 described later to image the reflected light. As a material that reflects infrared LED light, an aluminum foil, a thin film of titanium oxide, or the like is used. On the other hand, the black cells 112b are made of a material that does not reflect the infrared LED light emitted from the irradiation unit 123 described later such that the portion of the black cells 112b appears as a dark region in the image captured by the imaging units 124 and 125 described later. As a material that does not reflect infrared LED light, an infrared cut film, a polarizing film, an infrared absorber, black felt, or the like is used. That is, in the embodiment illustrated in FIGS. 19 and 20, the infrared LED light emitted from the irradiation unit 123 as a light emitting unit is reflected by the white cells 112a of the marker 111, and is received by the imaging units 124 and 125 as a light receiving unit to capture an image. At this time, since the black cells 112b of the marker 111, which is a detection target object, reduces the reflected light received by the imaging units 124 and 125, serving as a light receiving unit, a so-called regression reflection-type image acquisition configuration that detects decrease in the reflection amount is adopted.

The image processing device body 121 according to the embodiment illustrated in FIG. 19 can be configured to include a marker detection unit 122 and a control unit 127. Further, the marker detection unit 122 may include an irradiation unit 123, two imaging units 124 and 125, and a calculation unit 126.

The irradiation unit 123 can irradiate the marker 111 with infrared LED light, and is used for allowing the two imaging units 124 and 125 to read the reflected light reflected from the marker 111. The infrared LED light emitted from the irradiation unit 123 can image the marker 111 even in a dark place such as a plant or a place with strong visible light.

The two imaging units 124 and 125 are configured as two cameras arranged on the left and right sides of the marker detection unit 122. In these two imaging units 124 and 125, the two cameras image the light reflected from the white cells 112a after the infrared LED light emitted from the irradiation unit 123 is irradiated to the white cells 112a and the black cells 112b constituting the marker 111. In addition, the two imaging units 124 and 125 capture independent images, and the image data acquired using the two imaging units 124 and 125 is transmitted to the calculation unit 126.

The calculation unit 126 performs calculation based on triangulation on the basis of the image data transmitted from the two imaging units 124 and 125. In this way, it is possible to calculate the distance (relative distance) and the direction (relative angle) of the marker 111 with respect to the image processing device body 121 can be calculated.

Finally, the scanning and calculation method of the calculation unit 126 will be described with reference to FIG. 20. The calculation unit 126 acquires the image data captured by the two imaging units 124, 125 from the two imaging units 124, 125, and then binarizes the obtained image data to obtain the binarized image illustrated in FIG. 20. At the stage of this binarization process, the reflected light of the infrared LED light reflected from the white cells 112a and the portion not reflected from the black cells 112b are clarified by a black-and-white binarization process.

By applying the above-mentioned image processing device 110 to the mobile robot according to the present invention, it is possible to realize a mobile robot in which a marker is used as the detection target object. As described above, the mobile robot according to the present invention can take various modified forms.

For example, in the first and second embodiments described above, it has been described that the beacon detection unit 22 detects the beacon 11 having the beacon ID input from the beacon selection unit. However, the beacon detection unit 22 may calculate the beacon information of all the detected beacons 11 and output the calculated respective pieces of beacon information to the control unit 27. In this case, the beacon selection unit selects the beacon information of the target beacon 11 from the plurality of pieces of beacon information on the basis of the instruction output from the beacon selection unit 27b.

For example, the mobile robot 30 described above may have a computer system therein. In that case, the process of processing performed by the control unit 27 provided in the mobile robot 30 is stored in a computer-readable recording medium in the form of a program, and a computer reads and executes the program whereby the processes of each functional unit are realized. Here, the computer-readable recording medium refers to a magnetic disk, a magneto-optical disk, a CD-ROM, a DVD-ROM, a semiconductor memory, or the like. Further, this computer program may be distributed to a computer via a communication line, and the computer having received the distributed program may execute the program.

It should be noted that each of the above embodiments is presented as an example, and is not intended to limit the scope of the invention. These novel embodiments can be implemented in various other embodiments, and various omissions, replacements, and changes can be made without departing from the gist of the invention. These embodiments and modifications thereof are included in the scope and gist of the invention, and are also included in the scope of the invention described in the claims and the equivalent scope thereof.

It is clear from the claims that the embodiments with such modifications or improvements may also be included in the technical scope of the invention.

REFERENCE NUMERALS

11 (11-1, 11-2, 11-m) Beacon (Detection target object), 22 Beacon detection unit, 24, 25 Infrared sensor (Detection unit), 26 Calculation unit, 27 Control unit, 27a Movement route storage unit, 27b Beacon selection unit, 27c Drive control unit, $27c_1$ Passing position calculation unit, $27c_2$ Correction angle calculation unit, $27c_3$ Command value calculation unit, 30 Mobile robot, 31 Drive unit, 32, 33 Drive wheel, 34,35 Motor, 36 Motor control unit, 40 (40-1, 40-2) Boundary, Z Distance (to beacon), θ Direction, x Distance (Beacon passing distance), y Travel distance (Horizontal distance to beacon), Xref Certain distance, Ppass Passing point, δx, ΔX Difference, Δθ Correction angle, L Target route, 110 Image processing device, 111 Marker, 112 Cell, 112a White cell, 112b Black cell, 121 Image processing device body, 122 Marker detection unit, 123 Irradiation unit, 124, 125 Imaging unit, 126 Calculation unit, 127 Control unit.

The invention claimed is:

1. A mobile robot comprising:
    a drive unit that changes a moving speed and a travel direction;
    a detection unit that detects a plurality of detection target objects arranged along a movement route to a target point; and
    a control unit that acquires a distance and a direction to the detection target object detected by the detection unit, calculates a travel direction in which the distance and the direction to the detection target object satisfy a predetermined relationship, and drives and controls the drive unit on the basis of the calculated travel direction, wherein
    the mobile robot is used under a setting environment in which a boundary is set in the movement route at least on either a left or right side with respect to the travel direction of the mobile robot, the plurality of detection target objects are arranged along the boundary forming the movement route, and a target route is set at a position away from the boundary by a certain distance to cause the mobile robot to move while maintaining the certain distance from the boundary, and
    the control unit is configured to calculate a distance in a direction orthogonal to the movement route between the detection target object arranged along the boundary and a current position of the mobile robot on the basis of the distance and the direction to the detection target object detected by the detection unit at least when the mobile robot tries to start moving along the target route toward the target point, calculate a difference between the distance and the certain distance, and execute drive control for the drive unit to cause the difference to be 0 (zero).

2. The mobile robot according to claim 1, wherein the control unit is configured to execute the drive control to be executed on the drive unit to cause the difference to be 0 (zero) on the basis of feedback control.

3. A mobile robot control system comprising:
a drive unit that changes a moving speed and a travel direction of a mobile robot;
a detection unit that detects a plurality of detection target objects arranged along a movement route to a target point; and
a control unit that acquires a distance and a direction to the detection target object detected by the detection unit, calculates a travel direction in which the distance and the direction to the detection target object satisfy a predetermined relationship, and drives and controls the drive unit on the basis of the calculated travel direction,
a boundary being set in the movement route at least on either a left or right side with respect to the travel direction of the mobile robot,
the plurality of detection target objects being arranged along the boundary forming the movement route, and
a target route being set at a position away from the boundary by a certain distance to cause the mobile robot to move while maintaining the certain distance from the boundary, wherein
the control unit is configured to calculate a distance in a direction orthogonal to the movement route between the detection target object arranged along the boundary and a current position of the mobile robot on the basis of the distance and the direction to the detection target object detected by the detection unit at least when the mobile robot tries to start moving along the target route toward the target point, calculate a difference between the distance and the certain distance, and execute drive control for the drive unit to cause the difference to be 0 (zero).

4. The mobile robot control system according to claim 3, wherein
the control unit is configured to execute the drive control to be executed on the drive unit to cause the difference to be 0 (zero) on the basis of feedback control.

5. A mobile robot control method in a mobile robot comprising:
a drive unit that changes a moving speed and a travel direction of the mobile robot;
a detection unit that detects a plurality of detection target objects arranged along a movement route to a target point; and
a control unit that acquires a distance and a direction to the detection target object detected by the detection unit, calculates a travel direction in which the distance and the direction to the detection target object satisfy a predetermined relationship, and drives and controls the drive unit on the basis of the calculated travel direction,
a boundary being set in the movement route at least on either a left or right side with respect to the travel direction of the mobile robot,
the plurality of detection target objects being arranged along the boundary forming the movement route, and
a target route being set at a position away from the boundary by a certain distance to cause the mobile robot to move while maintaining the certain distance from the boundary, the method comprising processes of:
acquiring the distance and direction to the detection target object detected by the detection unit;
calculating the travel direction in which the distance and the direction to the detection target object satisfy a predetermined relationship; and
driving and controlling the drive unit on the basis of the calculated travel direction, wherein
the control unit executes a process of calculating a distance in a direction orthogonal to the movement route between the detection target object arranged along the boundary and a current position of the mobile robot on the basis of the distance and the direction to the detection target object detected by the detection unit at least when the mobile robot tries to start moving along the target route toward the target point, a process of calculating a difference between the distance and the certain distance, and a process of executing drive control for the drive unit to cause the difference to be 0 (zero).

6. The mobile robot control method according to claim 5, wherein
the control unit executes the drive control to be executed on the drive unit to cause the difference to be 0 (zero) on the basis of feedback control.

* * * * *